US012473965B2

(12) United States Patent
Lutoslawski et al.

(10) Patent No.: US 12,473,965 B2
(45) Date of Patent: Nov. 18, 2025

(54) SEGMENTED PULLEY TRANSMISSION AND ACTUATOR SYSTEM FOR THE SAME

(71) Applicant: 1783590 Ontario Inc., Toronto (CA)

(72) Inventors: Jaroslaw Lutoslawski, Toronto (CA); Sarah Jean Fondyga, Toronto (CA); Anthony Wong, Toronto (CA)

(73) Assignee: 1783590 Ontario Inc., Toronto (CA)

( * ) Notice: Subject to any disclaimer, the term of this patent is extended or adjusted under 35 U.S.C. 154(b) by 0 days.

(21) Appl. No.: 18/290,086

(22) PCT Filed: May 12, 2022

(86) PCT No.: PCT/CA2022/050750
§ 371 (c)(1),
(2) Date: Nov. 9, 2023

(87) PCT Pub. No.: WO2022/236421
PCT Pub. Date: Nov. 17, 2022

(65) Prior Publication Data
US 2024/0255047 A1    Aug. 1, 2024

Related U.S. Application Data

(60) Provisional application No. 63/187,907, filed on May 12, 2021.

(51) Int. Cl.
*F16H 55/54* (2006.01)
*F16H 9/10* (2006.01)
*F16H 9/24* (2006.01)

(52) U.S. Cl.
CPC ............... *F16H 55/54* (2013.01); *F16H 9/10* (2013.01); *F16H 9/24* (2013.01)

(58) Field of Classification Search
CPC ..................................... F16H 9/10; F16H 9/24
See application file for complete search history.

(56) References Cited

U.S. PATENT DOCUMENTS 1,838,104 A * 12/1931 Meglitz .................... F16H 55/54
474/54
3,956,944 A * 5/1976 Tompkins ................ B62M 9/08
474/54
(Continued)

FOREIGN PATENT DOCUMENTS

CN        101818794        9/2010
DE      102012008041      10/2013
(Continued)

OTHER PUBLICATIONS

International Preliminary Report on Patentability (IPRP) for PCT/CA2022/050750 (dated Nov. 23, 2023).
(Continued)

*Primary Examiner* — Anna M Momper
*Assistant Examiner* — Mark K Buse
(74) *Attorney, Agent, or Firm* — Faegre Drinker Biddle & Reath LLP

(57) ABSTRACT

A segmented pulley transmission with an actuator system is disclosed. The actuator system comprises: an engaging deflector radially movable between first active and idle positions; a disengaging deflector radially movable between second active and idle positions; and a motivator assembly for moving the engaging and disengaging deflectors between the active and idle positions. In the first active position, the engaging deflector is configured to move a plurality of pulley segments of the segmented pulley transmission from a disengaged region to an engaged region during rotational operation of the segmented pulley transmission. In the second active position, the disengaging deflector is configured to move the plurality of pulley segments from the engaged region to the disengaged region during rotational operation. In the first and second idle positions respectively, the engaging deflector and the disengaging deflector do not (Continued)

move the plurality of pulley segments during rotational operation of the segmented pulley transmission.

20 Claims, 20 Drawing Sheets

(56) References Cited

U.S. PATENT DOCUMENTS

| | | | | |
|---|---|---|---|---|
| 4,820,244 | A * | 4/1989 | Lander | B62M 9/08 |
| | | | | 474/56 |
| 5,582,555 | A * | 12/1996 | Miller | F16H 9/10 |
| | | | | 474/57 |
| 6,497,634 | B1 * | 12/2002 | Bode | F16H 55/54 |
| | | | | 474/139 |
| 7,156,764 | B2 * | 1/2007 | Mercat | B62M 25/045 |
| | | | | 474/47 |
| 8,753,236 | B2 | 6/2014 | Wong | |
| 2013/0267362 | A1 * | 10/2013 | Gheciu | B62M 9/105 |
| | | | | 474/164 |
| 2014/0155207 | A1 * | 6/2014 | Wong | F16H 9/24 |
| | | | | 474/163 |
| 2014/0248982 | A1 * | 9/2014 | Schuster | B62M 9/06 |
| | | | | 474/69 |
| 2016/0040772 | A1 * | 2/2016 | Appleton | F16H 55/54 |
| | | | | 474/55 |
| 2021/0003201 | A1 * | 1/2021 | Wong | F16H 55/171 |
| 2022/0228650 | A1 * | 7/2022 | Wong | F16H 9/24 |
| 2022/0228655 | A1 * | 7/2022 | Wong | F16H 55/56 |

FOREIGN PATENT DOCUMENTS

| | | |
|---|---|---|
| DE | 102012008041 A1 | 10/2013 |
| FR | 429909 | 10/1911 |
| FR | 429909 A | 10/1911 |
| WO | 2019173896 | 9/2019 |
| WO | 2020223786 | 11/2020 |
| WO | 2020223787 | 11/2020 |
| WO | 2020252558 | 12/2020 |
| WO | 2022061457 | 3/2022 |

OTHER PUBLICATIONS

Written Opinion received for International Patent Application No. PCT/CA2022/050750, dated Jun. 28, 2022.
Extended European Search Report (EESR) in corresponding PCT/CA2022/050750 application (dated Feb. 14, 2025). 11 pages.
International Search Report (ISR) in corresponding PCT/CA2022/050750 application (dated Jul. 18, 2022). 4 pages.
Extended European Search Report (EESR) in corresponding European Application No. 22806166.9 (dated Feb. 14, 2025). 11 pages.
International Search Report (ISR) in corresponding PCT/CA2022/050750 application (dated Jul. 12, 2022). 4 pages.

* cited by examiner

SEGMENTED PULLEY TRANSMISSION AND ACTUATOR SYSTEM FOR THE SAME

CROSS-REFERENCE TO RELATED APPLICATIONS

The present application is a U.S. National Phase of International Application No. PCT/CA2022/050750, filed on May 12, 2022 and entitled SEGMENTED PULLEY TRANSMISSION AND ACTUATOR SYSTEM FOR THE SAME, which claims the benefit of U.S. Provisional Patent Application No. 63/187,907 filed on May 12, 2021, and titled SEGMENTED PULLEY TRANSMISSION AND ACTUATOR SYSTEM FOR THE SAME, the entire disclosures of which are hereby expressly incorporated herein by reference.

FIELD

The subject disclosure generally relates to transmissions, and more particularly to a segmented pulley transmission and an actuator system for the same.

BACKGROUND

Transmissions are well known and can be used to change the ratio between rotating elements. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, segmented pulley transmissions, such as synchronized segmentally interchanging pulley transmission systems (SSIPTS), have been developed to reduce or alleviate at least some of these mechanical problems.

An example of an SSIPTS with a pulley assembly mounted on an axle is shown in U.S. Pat. No. 8,753,236 to Wong et al. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface matching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

PCT International Application Publication No. WO/2019/173896 to Wong et al. discloses a segmented pulley transmission with a pulley assembly for engaging an endless member. The pully assembly includes a first pulley, a second pulley and at least one transition segment set comprising one or more transition segments that are independently movable between an engaged region and a disengaged region to transition the endless member between the first pulley and the second pulley. An actuator system is also disclosed. The actuator system includes a support structure, an actuator subassembly secured to the support structure and a stator. The actuator subassembly includes a follower and a sled, which is movable in a circumferential direction between an advanced position and a retreated position, in response to an electromotive force generated on the sled by the stator. The follower engages the cam surface of the sled to move in an axial direction between an extended position and a retracted position as the sled moves between the advanced and retreated positions.

While the contributions of known segmented pulley transmissions are laudable, improvements and alternatives are generally desired. It is therefore an object to provide a novel segmented pulley transmission and actuator system for the same.

SUMMARY

It should be appreciated that this summary is provided to introduce a selection of concepts that are further described below in the detailed description of embodiments. This summary is not intended to be used to limit the scope of the claimed subject matter.

Accordingly, in an aspect, there is provided an actuator system for a segmented pulley transmission, the actuator system comprising: an engaging deflector radially movable between a first active position and a first idle position: a disengaging deflector radially movable between a second active position and a second idle position: and a motivator assembly for moving the engaging deflector and the disengaging deflector between the first active and idle positions and the second active and idle positions, respectively, wherein, in the first active position, the engaging deflector is configured to move a plurality of pulley segments of the segmented pulley transmission from a disengaged region to an engaged region during rotational operation of the segmented pulley transmission, wherein, in the second active position, the disengaging deflector is configured to move the plurality of pulley segments from the engaged region to the disengaged region during rotational operation of the segmented pulley transmission, and wherein, in the first and second idle positions, respectively, the engaging deflector and the disengaging deflector do not move the plurality of pulley segments during rotational operation of the segmented pulley transmission.

In one or more embodiments, the engaging deflector and the disengaging deflector may be independently movable between the first active and idle positions and the second active and idle positions, respectively. The engaging deflector may include an engaging cam and the disengaging deflector may include a disengaging cam, and the engaging and disengaging cams may be configured to move the plurality of pulley segments between the engaged region and the disengaged region during rotational operation of the segmented pulley transmission.

In one or more embodiments, the actuator system may further comprise a barrier configured to restrict movement of the plurality of pulley segments between the engaged region and the disengaged region during rotational operation of the segmented pulley transmission. The barrier may comprise a gap to permit movement of the plurality of pulley segments between the engaged region and the disengaged region. The barrier may comprise a circumferentially extending wall and the gap is located in the circumferentially extending wall. At least one of the engaging deflector and the disengaging deflector may be rotatably coupled to the barrier.

In one or more embodiments, the actuator system may further comprise a blocking deflector radially movable between a blocking position and a third idle position, wherein, during rotational operation of the segmented pulley transmission, the blocking deflector obstructs movement of the plurality of pulley segments through the gap when in the blocking position and does not obstruct moment of the pulley segments when in the third idle position. The blocking deflector may be rotatably coupled to the barrier.

In one or more embodiments, the actuator system may further comprise a fixed deflector that includes an engaging surface, the engaging surface cooperating with the engaging deflector to move the plurality of pulley segments from the disengaged region to the engaged region during rotational operation of the segmented pulley transmission. The fixed deflector may further include a disengaging surface, the disengaging surface cooperating with the disengaging deflector to move the plurality of pulley segments from the engaged region to the disengaged region during rotational operation of the segmented pulley transmission. The engaging cam surface may be located on a first side of the fixed deflector and the disengaging cam surface may be located on a second side of the fixed deflector, opposite the first side. The fixed deflector may be integrally formed with the barrier.

In one or more embodiments, the actuator system may further comprise a plurality of followers for coupling to the plurality of pulley segments, each of the followers may be couplable to a respective one of the pulley segments. The engaging deflector and the disengaging deflector may move the plurality of pulley segments between the engaged region and the disengaged region by deflecting the plurality of followers coupled to the plurality of pulley segments, thereby driving the pulley segments between the engaged region and the disengaged region during rotational operation of the segmented pulley transmission. Each of the followers may comprise a roller that includes a contact surface for contacting the engaging deflector and the disengaging deflector.

In one or more embodiments, the motivator assembly may comprise at least one solenoid for moving the engaging deflector and the disengaging deflector between the first active and idle positions and the second active and idle positions, respectively. The at least one solenoid may comprise a first solenoid for moving the engaging deflector from the first idle position to the first active position, and the at least one solenoid may comprise a second solenoid for moving the disengaging deflector from the second idle position to the second active position. The motivator assembly may comprise at least one spring biasing the engaging deflector and the disengaging deflector toward the first and second idle positions, respectively.

In another aspect, there is provided a segmented pulley transmission comprising: a first pulley assembly rotatable about a first axis: a second pulley assembly spaced apart from the first pulley assembly and rotatable about a second axis, the second pulley assembly comprising: a fixed pulley: and a segmented pulley concentric with the fixed pulley and moveable between an engaged region and a disengaged region: an endless member extending between and rotationally coupling the first pulley assembly and the second pulley assembly: an actuator system as defined in the above paragraph for moving the segmented pulley between the engaged region and the disengaged region; and a housing at least partially supporting at least one of the first pulley assembly, second pulley assembly, the endless member and the actuator.

BRIEF DESCRIPTION OF THE DRAWINGS

Embodiments will now be described more fully with reference to the accompanying drawings, in which.

DETAILED DESCRIPTION OF EMBODIMENTS

Figure 1:
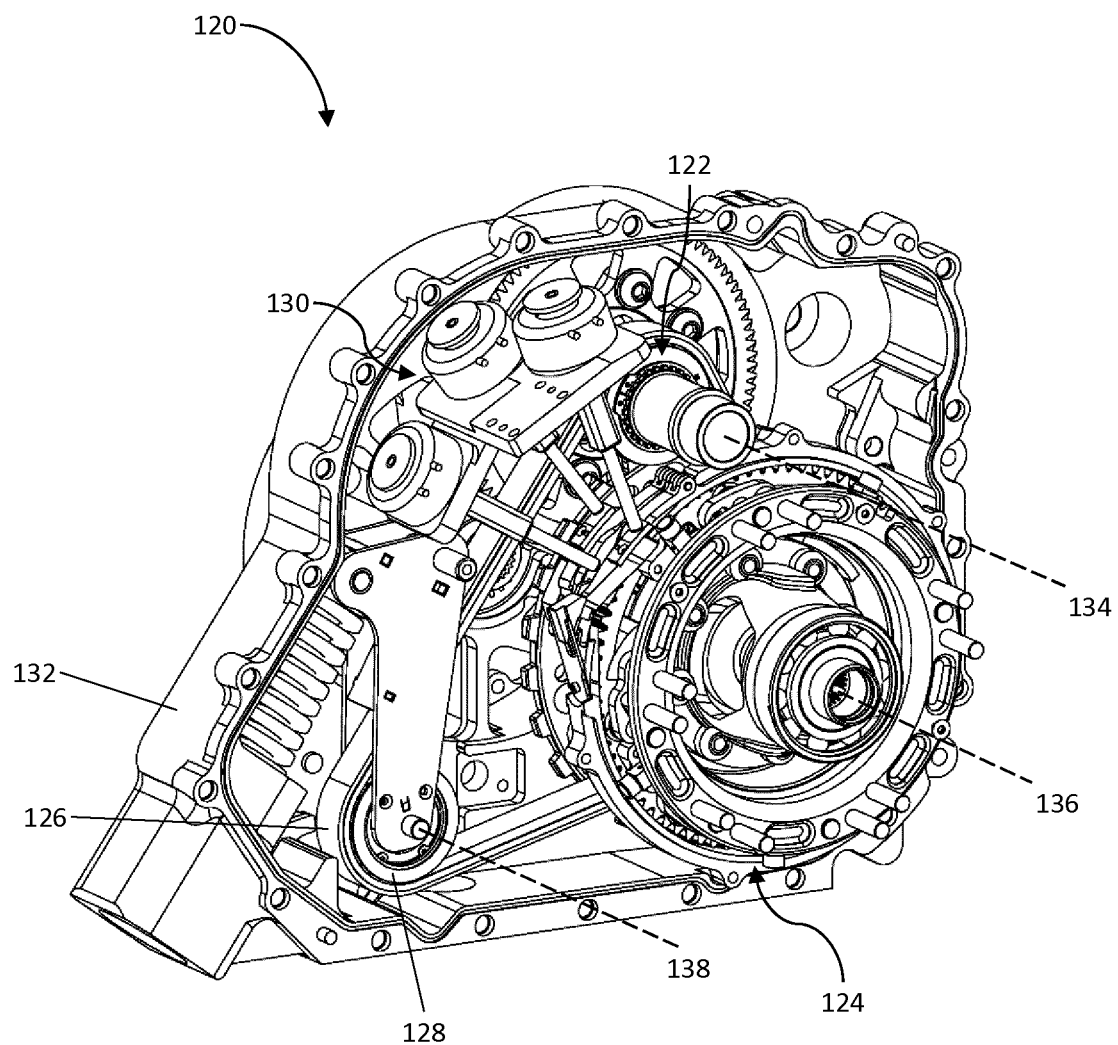
FIG. 1 is an axonometric view of a transmission with a housing of the transmission partially omitted to view an interior the transmission.

The foregoing summary, as well as the following detailed description of certain embodiments will be better understood when read in conjunction with the accompanying drawings. As used herein, an element or feature described in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the described elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "contacting," etc. another element or feature, that element or feature can be directly on, attached to, connected to, coupled with or contacting the other element or feature or intervening elements may also be present. In contrast, when an element or feature is referred to as being, for example, "directly on," "directly attached" to, "directly connected" to, "directly coupled" with or "directly contacting" another element of feature, there are no intervening elements or features present.

It will be understood that spatially relative terms, such as "under," "below," "lower," "over," "above," "upper," "front," "back" and the like, may be used herein for ease of describing the relationship of an element or feature to another element or feature as depicted in the figures. The elements described with these spatially relative term may, however, encompass different orientations in use or operation than the orientation depicted in the figures.

Reference herein to an "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

As used herein, an element or feature "configured to" produce an effect denotes an actual state of configuration that fundamentally ties the physical characteristics of the element of feature to the effect.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

PCT International Application Publication No. WO/2020/223787 to Wong et al., published on Nov. 29, 2019, discloses an actuator system for a segmented pulley transmission. The actuator system includes a single deflector configured to rotate between a first position and a second position to selectively move segments of a segmented pulley between an engaged region and a disengaged region. The deflector moves between the first and second positions in an axial direction of the segmented pulley. While the contributions of this actuator are laudable, moving the deflector axially between the first and second positions requires the deflector to pass between protrusions on the pulley segments during rotational operation of the segmented pulley transmission. Careful timing is required to synchronize the movements of the deflector with the movements of the pulley segments and the window of time during which the deflector can move between positions is relatively short. Accordingly, improvements may be desired, such as an actuator with a longer window of time for moving the deflector and/or shorter movement distances, to provide more forgiving synchronization between the movements of the deflector and the movements of the pulley segments.

Figure 2:
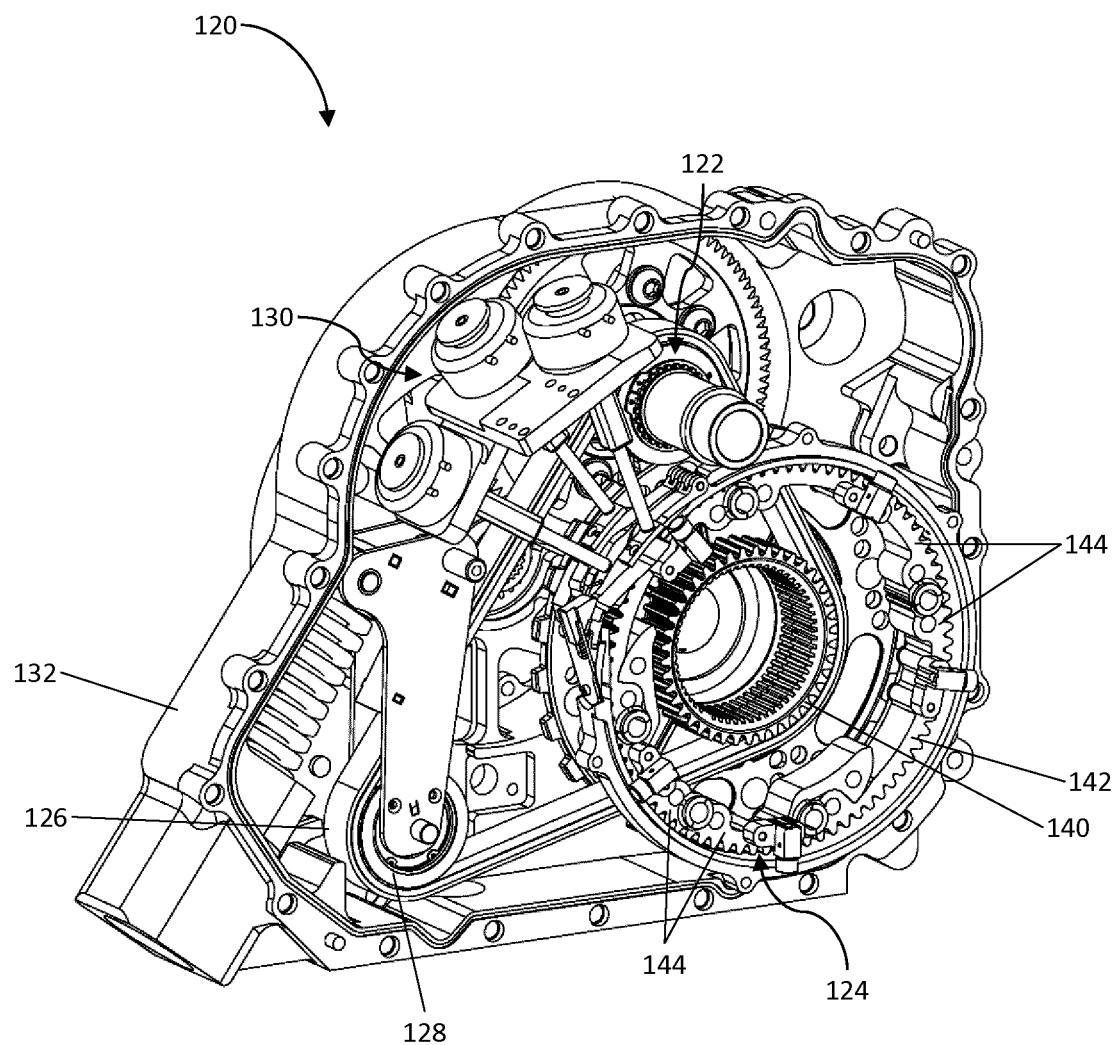
FIG. 2 is an axonometric view of the transmission of FIG. 1 with further elements omitted to further facilitate viewing of the interior.

FIGS. 1 and 2 show a transmission, generally identified by reference character 120. The transmission 120 is a segmented pulley transmission and, more particularly, a synchronized segmentally interchanging pulley transmission system (SSIPTS). As will be appreciated, a portion of the transmission's housing has been omitted in FIG. 1 so internal elements of the transmission 120 can be viewed. Further elements, such as a hub and connecting rods, have been additionally omitted in FIG. 2 to facilitate viewing of the internal elements of the transmission 120. In some embodiments, the transmission 120 includes elements such as those disclosed in U.S. Provisional Patent Application No. 63/081,379 and/or PCT International Application Nos. PCT/CA2018/173896, PCT/CA2019/051712 and/or PCT/CA2019/051714, the relevant portions of which are incorporated herein by reference.

The transmission 120 is configured to rotationally couple a first rotating element and a second rotating element, such as a driving axle and a driven axle of a power train. The transmission 120 is further configured to change a rotation ratio between the first and second rotating elements. The transmission 120 comprises a first pulley assembly 122, a second pulley assembly 124, an endless member 126, an idler pulley 128, an actuator system 130 and a housing 132. In the embodiment shown, the transmission further comprises a tensioner assembly, such as that disclosed in PCT International Application No. PCT/CA2021/051322, the relevant portions of which is incorporated herein by reference.

The elements and operation of the transmission 120 are described in detail below. However, in brief, the first pulley assembly 122 is rotatable about a first axis 134 and comprises a single fixed pulley. The second pulley assembly 124 is spaced apart from the first pulley assembly 122 and is rotatable about a second axis 136. The second pulley assembly 124 comprises an inner, fixed pulley and an outer, segmented pulley. The endless member 126 extends between and rotationally couples the first pulley assembly 122, the second pulley assembly 124 and the idler pulley 128. The actuator system 130 is configured to move the segmented pulley of the second pulley assembly 124 between an engaged region and a disengaged region, to change the rotation ratio of the transmission 120. The housing 132 at least partially surrounds and supports one or more of the first pulley assembly 122, the second pulley assembly 124, the endless member 126, the idler pulley 128 and the actuator system 130. During operation of the transmission 120, the first pulley assembly 122 is coupled to the first rotating element of the power train and the second pulley assembly 124 is coupled to the second rotating element of the power train, such that rotation of the first rotating element causes rotation of the second rotating element, or vice versa, at a rotation ratio of the transmission 120.

The first pulley assembly 122 is configured to be coupled to the first rotating element (not shown), such as by screws, bolts, a slotted shafts, a key and keyway or other suitable coupling mechanisms. The first pulley assembly 122 is configured to rotate during operation of the transmission 120. The first pulley assembly 122 is concentric with and rotatable about the first axis 134. The first pulley assembly 122 comprises a single fixed pulley 140. The fixed pulley 140 is unitary. The fixed pulley 140 includes an outer peripheral surface for engaging the endless member 126. The outer peripheral surface is generally circular and may include a plurality of mating features, such as teeth, for engaging corresponding mating features on the endless member 126.

The second pulley assembly 124 is configured to be coupled to the second rotating element (not shown), such by a hub, and/or connecting rods as disclosed in PCT International Application Nos. PCT/CA2018/051475, the relevant portions of which are incorporated herein by reference, or by other suitable coupling mechanisms. The second pulley assembly 124 is configured to rotate during operation of the transmission 120. The second pulley assembly 124 is spaced apart from the first pulley assembly 122 and is rotatable about the second axis 136. The second pulley assembly 124 comprises an inner, fixed pulley 140 and an outer, segmented pulley 142. The segmented pulley 142 is concentric with the inner pulley 140. The segmented pulley 142 can selectively surround the inner pulley 140 during rotational operation of the transmission 120 to engage the endless member 126 and change the rotation ratio of the transmission 120.

The inner pulley 140 is configured to be coupled to the second rotating element, such as by the hub described above or by other suitable coupling mechanisms like screws, bolts, a slotted shafts or a key and keyway. The inner pulley 140 is rotatable about and concentric with the second axis 136. The inner pulley 140 is configured to engage the endless member 126. The inner pulley 140 is unitary. The inner pulley 140 includes an outer peripheral surface for engaging the endless member 126. The outer peripheral surface is generally circular and may include a plurality of mating features, such as teeth, for engaging corresponding mating features on the endless member 126. The inner pulley 140 is a core pulley of the second pulley assembly 124. That is, the inner pulley 140 is the centermost or smallest diameter pulley in the second pulley assembly 124.

The segmented pulley 142 is configured to be coupled to the second rotating element, such as by the hub and/or the connecting rods as described above or by other suitable coupling mechanisms. The segmented pulley 142 is rotatable about and concentric with the second axis 136. The segmented pulley 142 is configured to engage the endless member 126. The segmented pulley 142 includes an outer peripheral surface for engaging the endless member 126. The outer peripheral surface is generally circular and may include a plurality of mating features, such as teeth, for engaging corresponding mating features on the endless member 126. The segmented pulley 142 comprises a plurality of pulley segments 144. The pulley segments 144 are circularly arranged to form the segmented pulley 142.

The plurality of pulley segments 144 is configured to engage the endless member 126. Each of the pulley segments 144 includes a body that defines a portion of the outer peripheral surface of the segmented pulley 142. The plurality of pulley segments 144 are the same as those described in above-incorporated PCT International Application No. PCT/CA2019/051712. The pulley segments 144 are configured to be sequentially movable between an engaged region and a disengaged region to transition the endless member 126 between the inner pulley 140 and the segmented pulley 142. In the subject embodiment, the plurality of pulley segments 144 are individually movable between the engaged region and the disengaged region. The plurality of pulley segments 144 are moved between the engaged region and the disengaged region by the actuator system 130.

In the context of the subject disclosure, the "engaged region" is a region wherein elements of the second pulley assembly 124 will engage the endless member 126 during rotational operation of the transmission 120, when those elements are not surrounded or obstructed by other elements of second pulley assembly 124. In contrast, the "disengaged region" is a region wherein elements of the second pulley assembly 124 will not engage the endless member 126 during rotational operation of the transmission 120, regardless of their exposure or the position of the other elements of the second pulley assembly 124. In the subject embodiment, it will be appreciated that the inner pulley 140 is permanently located within the engaged region, as the inner pulley 140 will always engage the endless member 126 if not surrounded by the plurality of pulley segments 144 during rotational operation of the transmission 120. In contrast, the plurality of pulley segments 144 will only be in the engaged region when moved into a plane defined by the endless member 126, where the plurality of pulley segments 144 surround the inner pulley 140 and will engage the endless member 126 during rotational operation of the transmission 120.

The endless member 126 is configured to rotationally couple the first pulley assembly 122 and the second pulley assembly 124. The endless member 126 extends between the first pulley assembly 122 and the second pulley assembly 124. The endless member 126 includes an inner surface that is configured to engage the first pulley assembly 122 and the second pulley assembly 124. In FIGS. 1 and 2, the endless member 126 is shown as a schematic representation without any mating features. However, as will be appreciated, the endless member 126 can include corresponding mating features, such as complimentary teeth and/or holes, for engaging the mating features of the first and second pulley assemblies 122, 124. As will be appreciated, the endless member 126 may comprise a chain, a belt or other suitable type of endless member.

The idler pulley 128 is rotatable about an idler axis 138. The idler pulley 128 is configured to engage the endless member 126. The idler pulley 128 includes an outer peripheral surface for engaging the endless member 126. The outer peripheral surface is generally circular and may include a plurality of mating features, such as teeth, for engaging the corresponding mating features on the endless member 126. The idler pulley 128 is moveable within the transmission 120 to control tension in the endless member 126. In some embodiments, the transmission 120 includes a tensioner assembly to move the idler pulley 128, such as the tensioner assembly disclosed in above-incorporated PCT International Application No. PCT/CA2021/051322.

Figure 3:
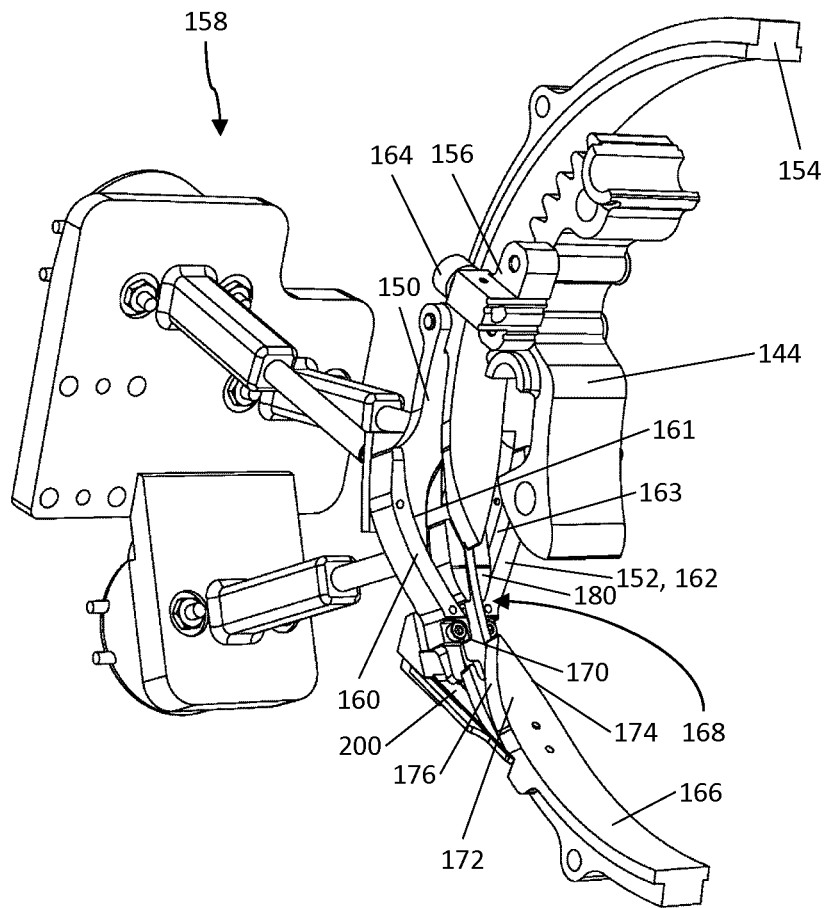
FIGS. 3 to 7 are detail views of an actuator system and a pulley segment of the transmission of FIG. 1 showing a sequence for transitioning the pulley segment from a disengaged region to an engaged region.

The actuator system 130 is configured to selectively transition the plurality of pulley segments 144 between the engaged region and the disengaged region. The actuator system 130 is further configured to inhibit accidental movement of the pulley segments 144 between the engaged region and the disengaged region. As shown in at least FIG. 3, the actuator system comprises an engaging deflector 150, a disengaging deflector 152, a barrier 154, a plurality of followers 156 and a motivator assembly 158. As will be appreciated, only one of the followers 156 on one of the pulley segments 144 is shown in FIG. 3: the remaining followers 156 on the remaining pulley segments 144 can be seen in FIG. 2. The actuator system 130 may further comprise a blocking deflector 180, as shown in FIG. 3. The engaging deflector 150, disengaging deflector 152 and blocking deflector 180 are all aligned in an axial direction of the second pulley assembly 124, and are all located generally radially outward of the segmented pulley 142, as shown in FIG. 2. The motivator assembly 158 is located radially outward of and aligned with the deflectors 150, 152, 180. The barrier 154 is positioned radially outward of the segmented pulley 142. The barrier 154 encircles the segmented pulley 142, when the segmented pulley 142 is in the disengaged region. The plurality of followers 156 are coupled to the plurality of pulley segments 144, with each of the followers 156 coupled to a respective one of the pulley segments 144.

Figure 4:
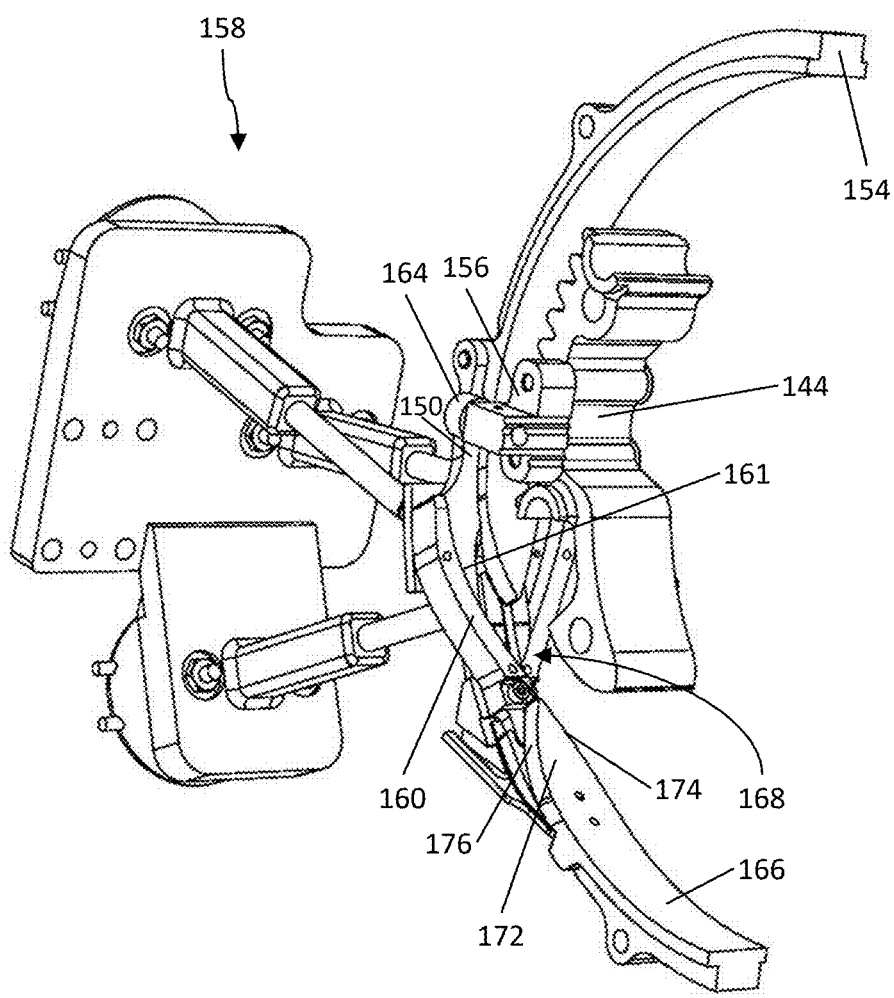
Figure 17:
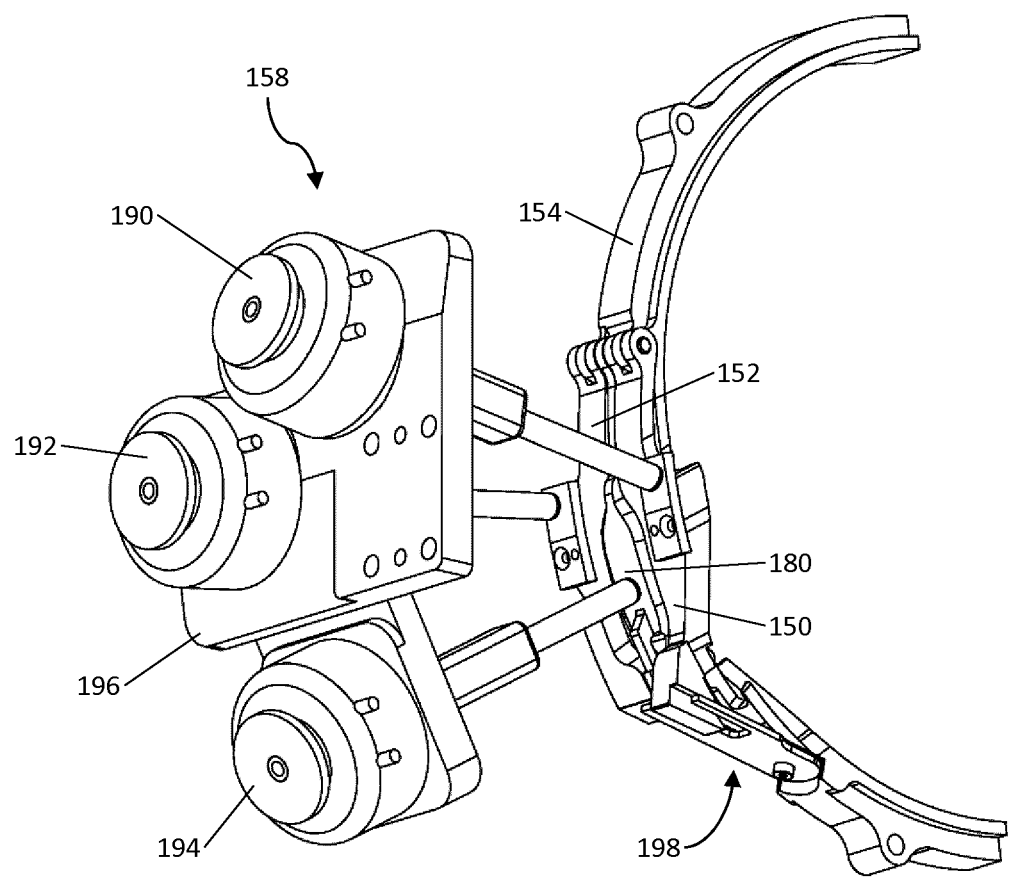
FIGS. 17 to 20 are detail views of the actuator system of the transmission of FIG. 1 showing a sequence for moving a plurality of deflectors between idle and active positions, using a motivator assembly of the actuator system.
Figure 18:
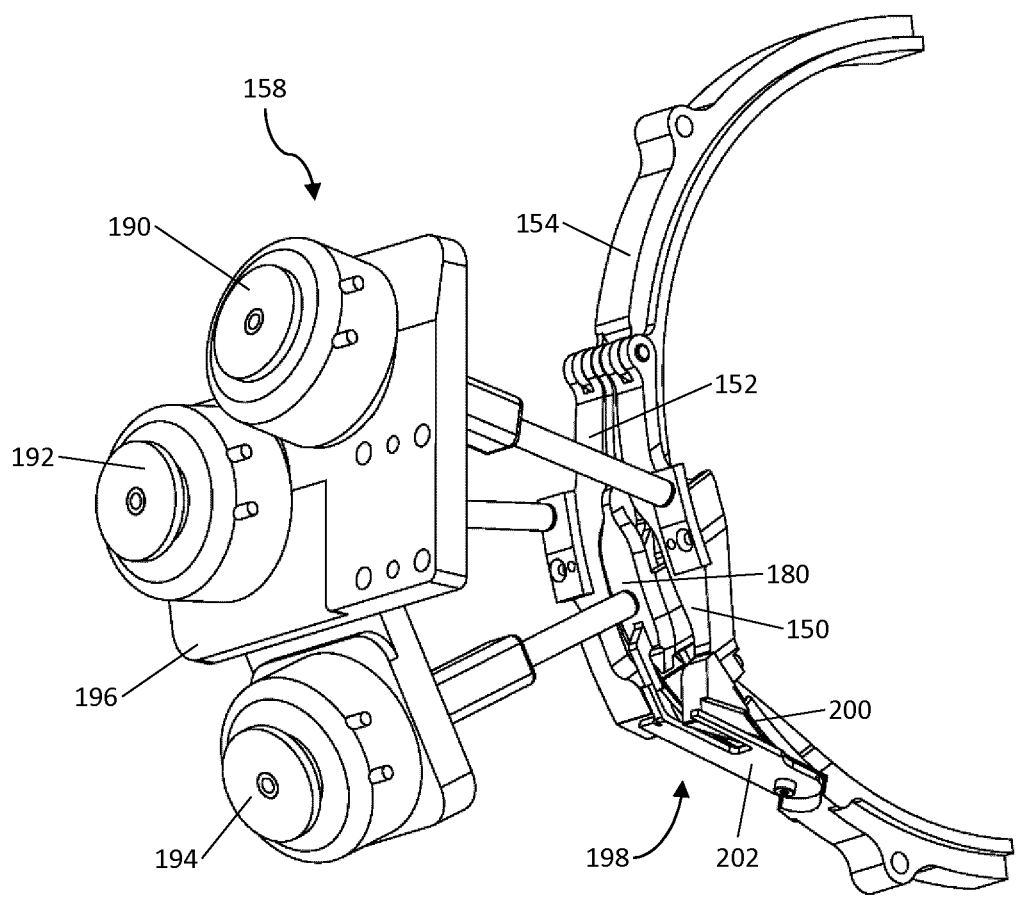

The engaging deflector 150 is configured to move the plurality of pulley segments 144 from the disengaged region to the engaged region. The engaging deflector 150 has an elongate shape with a circumferential curve generally matching that of the outer peripheral surface of the segmented pulley 142. At a root or proximal end of the engaging deflector 150, the engaging deflector 150 is rotatably coupled to the barrier 154, such that the engaging deflector 150 is radially movable between a first idle position and a first active position. In the subject embodiment, the first idle position is a radially outward position of the engaging deflector 150 (as shown in FIGS. 3 and 17), and the first active position is a radially inward position of the engaging deflector 150 (as shown in FIGS. 4 and 18). The engaging deflector 150 includes an engaging cam 160 at a distal end thereof. The engaging cam 160 projects radially inward and extends axially from a disengaged side of the actuator system 130 towards an engaged side of the actuator system 130. As will be appreciated, the disengaged side of the actuator system 130 is the side adjacent the disengaged region, and the engaged side of the actuator system 130 is the side adjacent the engaged region. The engaging cam 160 has an engaging cam surface 161. The engaging cam surface 161 extends from the disengaged side towards the engaged side of the actuator system 130. In the subject embodiment, at least a portion of the engaging cam surface 161 follows a hyperbolic shape. The hyperbolic shape imparts a constant acceleration on the pulley segments 144 as the engaging deflector 150 moves the pulley segments 144 from the disengaged region to the engaged region.

Figure 8:
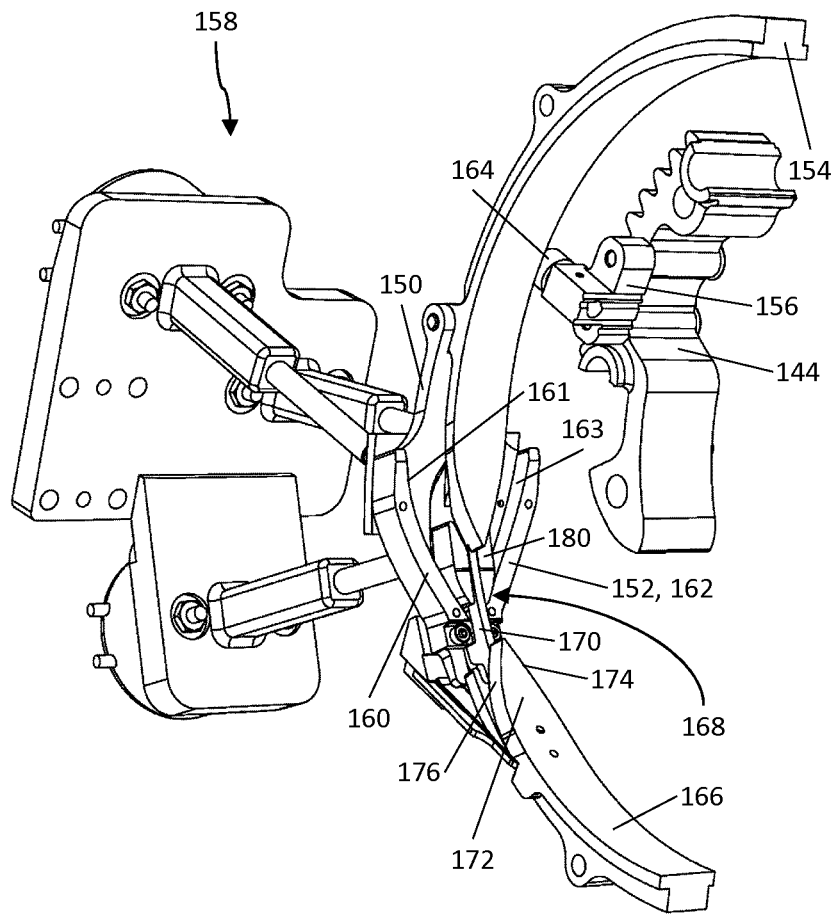
FIGS. 8 to 12 are detail views of the actuator system and the pulley segment of the transmission of FIG. 1 showing a sequence for transitioning the pulley segment from the engaged region to the disengaged region.
Figure 9:
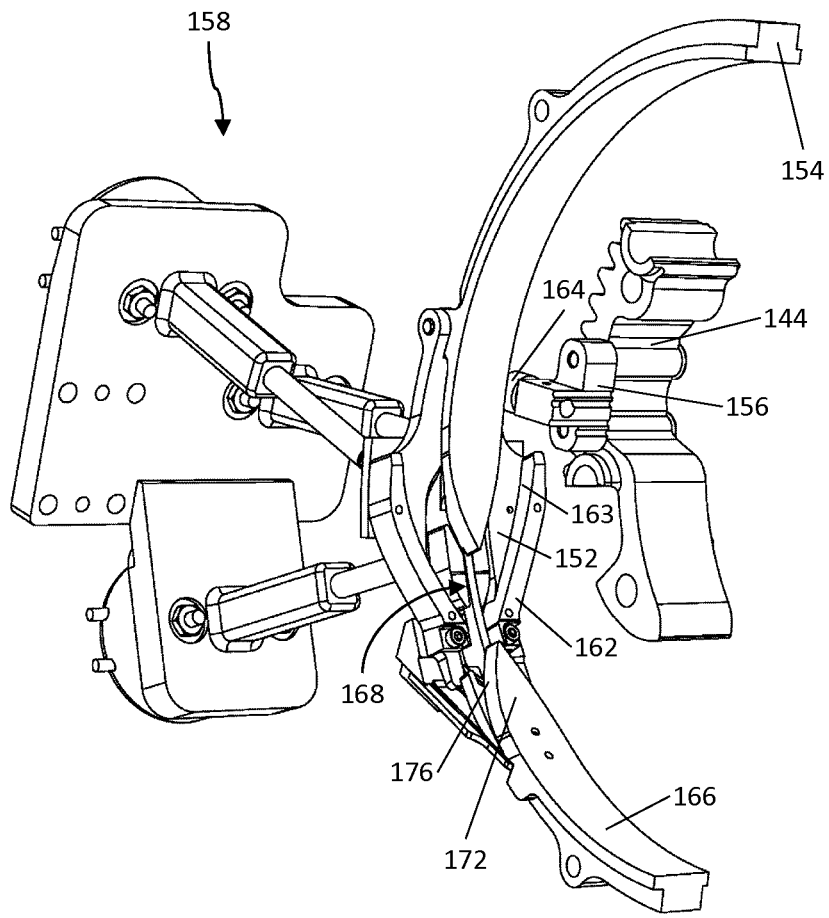
Figure 19:
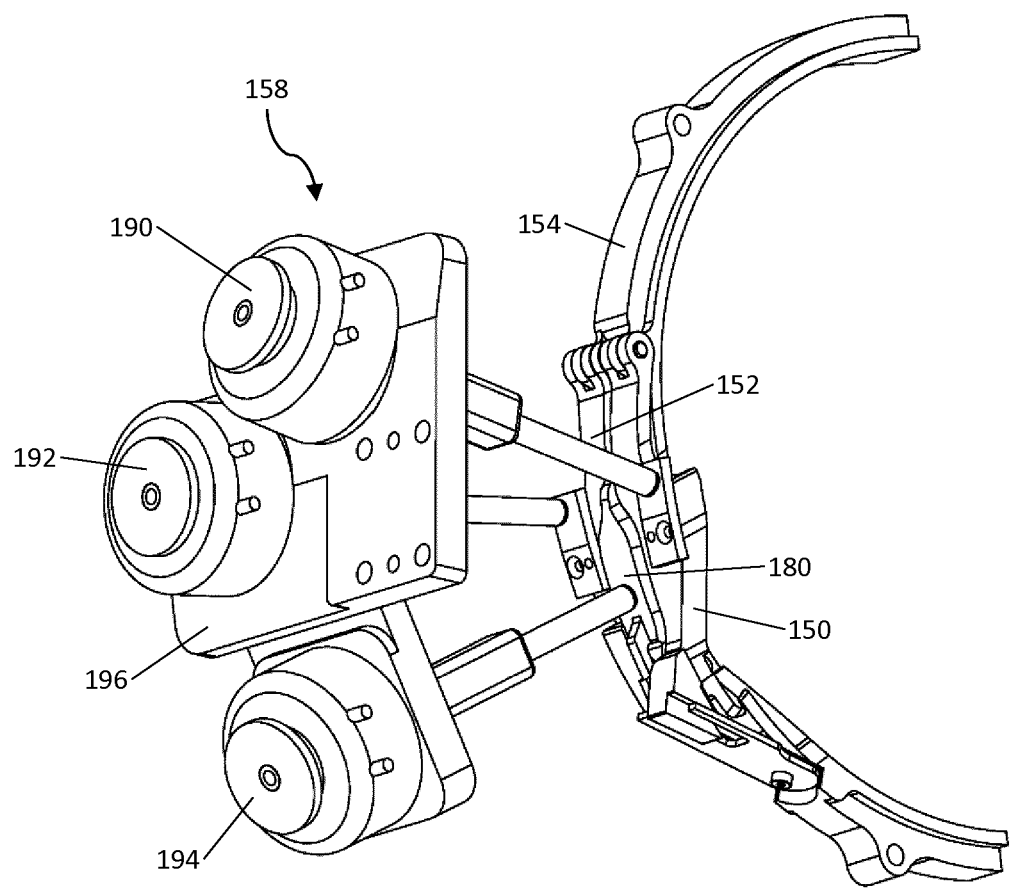

The disengaging deflector 152 is configured to move the plurality of pulley segments 144 from the engaged region to the disengaged region. The disengaging deflector 152 has an elongate shape with a circumferential curve generally matching that of the outer peripheral surface of the segmented pulley 142. At a root or proximal end of the disengaging deflector 152, the disengaging deflector 152 is rotatably coupled to the barrier 154, such that the disengaging deflector 152 is radially movable between a second idle position and a second active position. In the subject embodiment, the second idle position is a radially outward position of the disengaging deflector 152 (as shown in FIGS. 8 and 17), and the second active position is a radially inward position of the disengaging deflector 152 (as shown in FIGS. 9 and 19). The disengaging deflector 152 includes a disengaging cam 162 at a distal end thereof. The disengaging cam 162 projects radially inward and extends from the engaged side of the actuator system 130 towards the disengaged side of the actuator system 130. The disengaging cam 162 has a disengaging cam surface 163. The disengaging cam surface 163 extends from the engaged side towards the disengaged side of the actuator system 130. In the subject embodiment, at least a portion of the disengaging cam surface 163 follows a hyperbolic shape. The hyperbolic shape imparts a constant acceleration on the pulley segments 144 as the disengaging deflector 152 moves the pulley segments 144 from the engaged region to the disengaged region.

The plurality of followers 156 are configured to move the plurality of pulley segments 144 between the engaged region and the disengaged region. The plurality of followers 156 operate in conjunction with at least the engaging deflector 150 and the disengaging deflector 152 to move the plurality of pulley segments 144 between the engaged region and the disengaged region during rotational operation of the transmission 120. Each of the followers 156 is coupled to a respective one of the pulley segments 144. The followers 156 can be coupled to the pulley segments 144 by fasteners, welding, interlocking features or other suitable mechanisms. Each follower 156 extends from the respective pulley segment 144 and includes a contact surface 164. In the subject embodiment, each follower 156 extends outward from the respective pulley segment 144 in a generally radial direction of the segmented pulley 142, and the contact surface 164 is located at a radially outward end of the follower 156. In the subject embodiment, the follower 156 comprises a roller at the radially outward end, and the roller provides the contact surface 164. The contact surface 164 is configured to contact the deflectors 150, 152 during rotational operation of the transmission 120 to move the plurality of pulley segments 144 between the engaged region and the disengaged region. Each follower 156 is axially offset from the outer peripheral surface of the segmented pulley 142. That is, each of the followers 156 is offset in the direction of the second axis 136 from the outer peripheral surface of the respective pulley segment 144 to which the follower 156 is coupled. As will be appreciated, axially offsetting the followers 156 from the outer peripheral surface of the segmented pulley 142 avoids interference between the followers 156 and the endless member 126 during rotational operation of the transmission 120. As described below, the contact surface 164 of each of the followers 156 contacts either the engaging cam surface 161 of the engaging cam 160 or the disengaging cam surface 163 of the disengaging cam 162 during rotational operation of the transmission 120 to move the respective pulley segment 144 between the engaged region and the disengaged region. In the subject embodiment, the roller that provides the contact surface 164 is configured to contact the cam surfaces 161, 163 and roll therealong, to drive the respective pulley segment 144 between the engaged region and the disengaged region.

The barrier 154 is configured to inhibit accidental movement of the plurality of pulley segments 144 between the engaged region and the disengaged region. The barrier 154 comprises a circumferentially extending ring 166 with a gap 168. The barrier 154 further comprises a bridge 170 that extends over the gap 168 and connects the ends of the circumferential ring 166, to improve rigidity of the barrier 154. The ring 166 of the barrier 154 is positioned between the rotational path of the followers 156 when the pulley segments 144 are in the engaged region and the rotational path of the followers 156 when the pulley segments 144 are in the disengaged region. In the subject embodiment, the barrier 154 is axially positioned between the rotational paths defined by the contact surfaces 164 of the followers 156. Accordingly, the contact surfaces 164 of the followers 156 abut the ring 166 during rotational operation of the transmission 120 and prevent the pulley segments 144 from moving between the engaged and disengaged regions, except when the contact surfaces 164 of the followers 156 are aligned with the gap 168. When the contact surface 164 of a respective follower 156 is aligned with the gap 168, the respective follower 156 is able to pass through the gap 168 to permit the pulley segment 144 to move between the engaged and disengaged regions, during rotational operation of the transmission 120. The gap 168 is aligned with the engaging cam 160 and the disengaging cam 162 on the engaging deflector 150 and the disengaging deflector 152, respectively, so the cams 160, 162 can deflect the followers 156 through the gap 168, as described in detail below. In the subject embodiment, the barrier 154 further comprises a fixed deflector 172. The fixed deflector 172 is formed at a tip of the ring 166. The fixed deflector 172 includes a fixed engaging surface 174, which cooperates with the engaging deflector 150 to move the pulley segments 144 from the disengaged region to the engaged region. The fixed deflector 172 further includes a fixed disengaging surface 176, which cooperates with the disengaging deflector 152 to move the pulley segments 144 from the engaged region to the disengaged region. In the subject embodiment, the fixed deflector 172 is double sided, with the fixed engaging surface 174 on one side and the fixed disengaging surface 176 on the opposite side of the fixed deflector 72.

Figure 13:
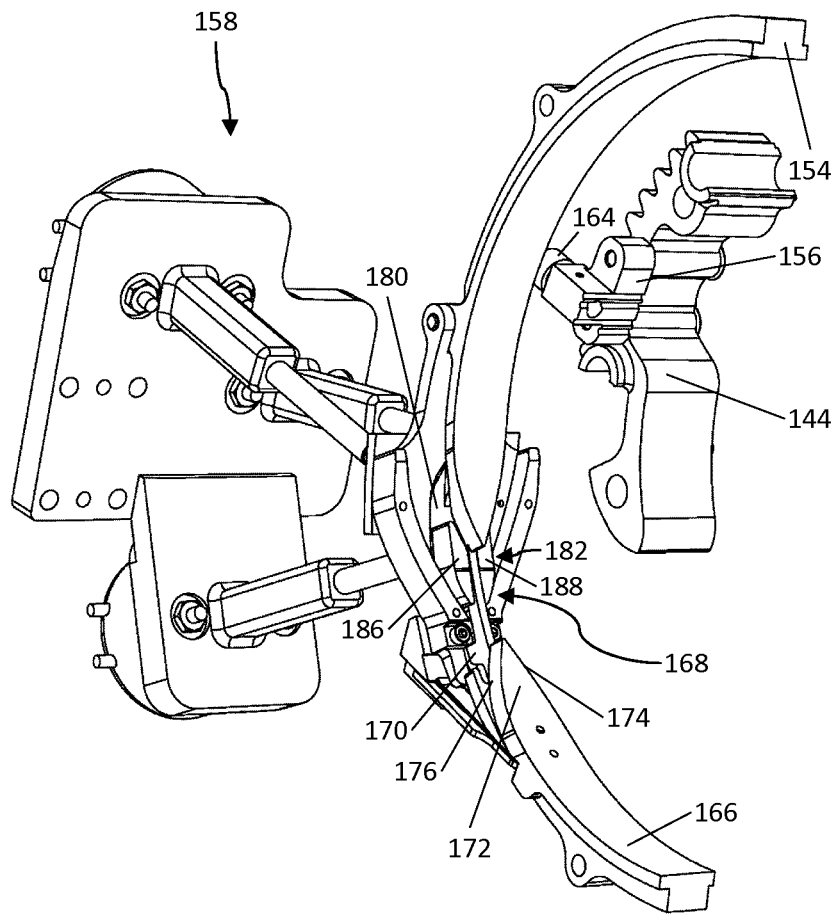
FIGS. 13 to 16 are detail views of the actuator system and the pulley segment of the transmission of FIG. 1 showing a sequence for blocking the pulley segment from transitioning between the disengaged region to the engaged region.
Figure 14:
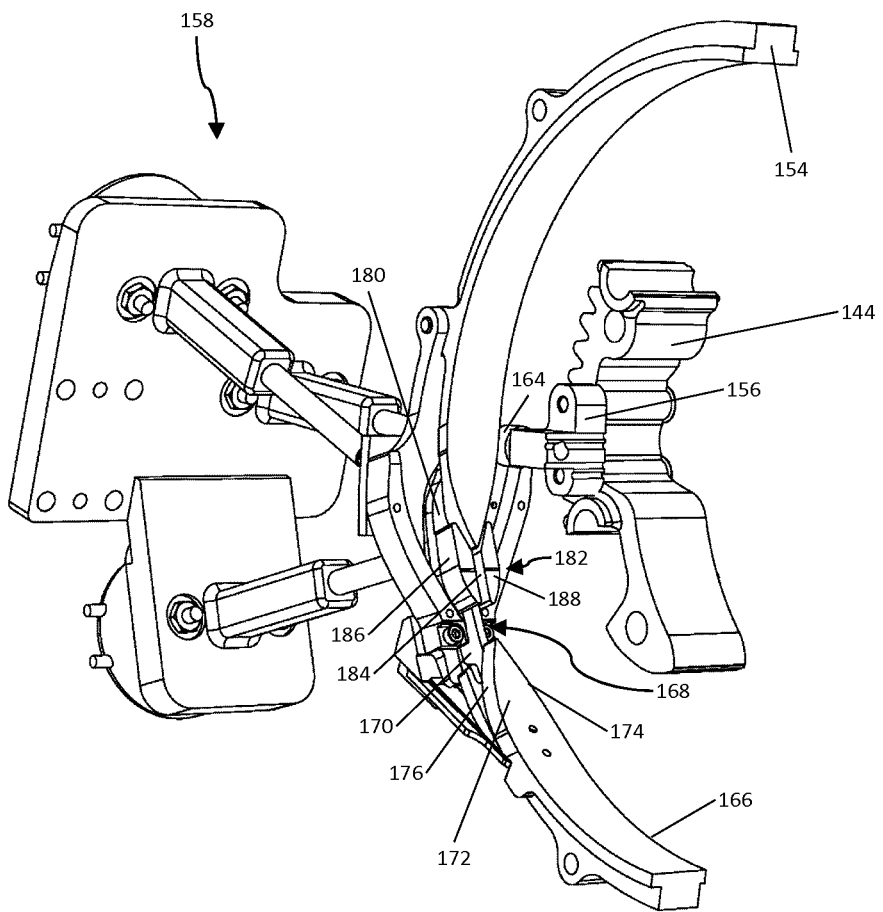
Figure 15:
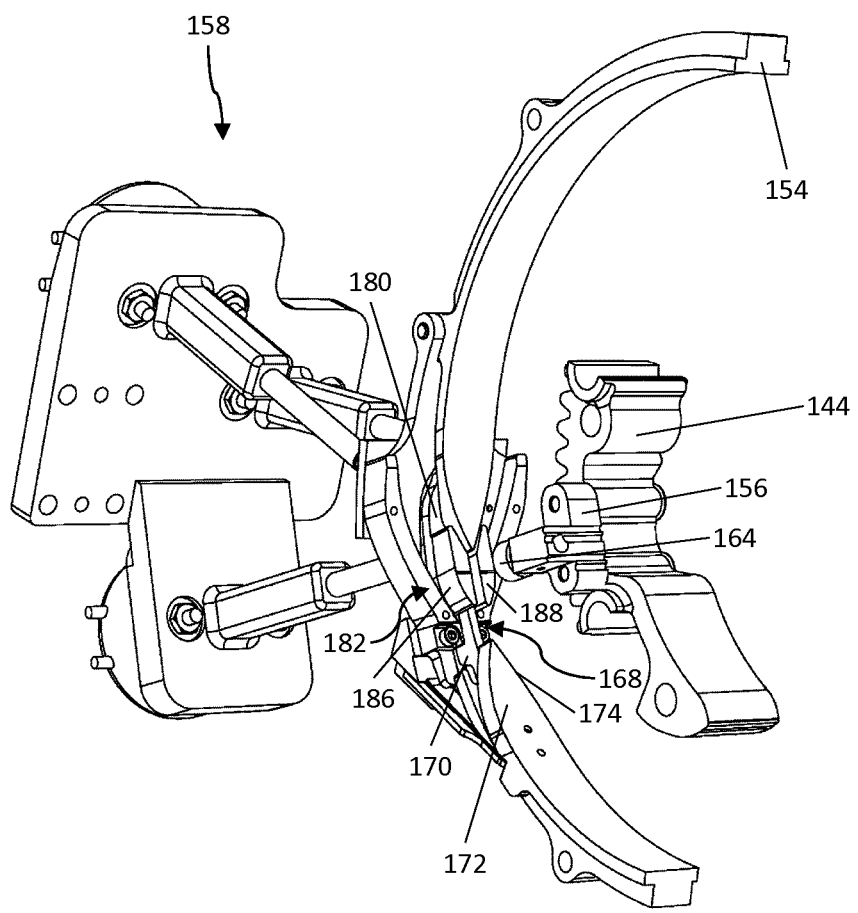
Figure 16:
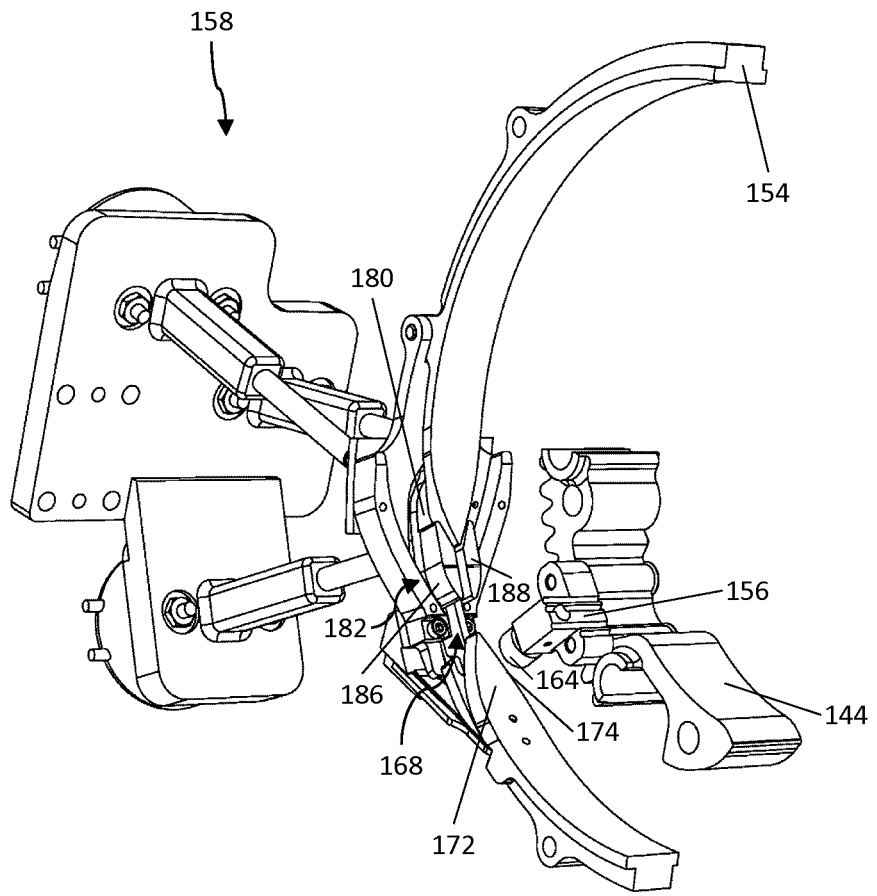
Figure 20:
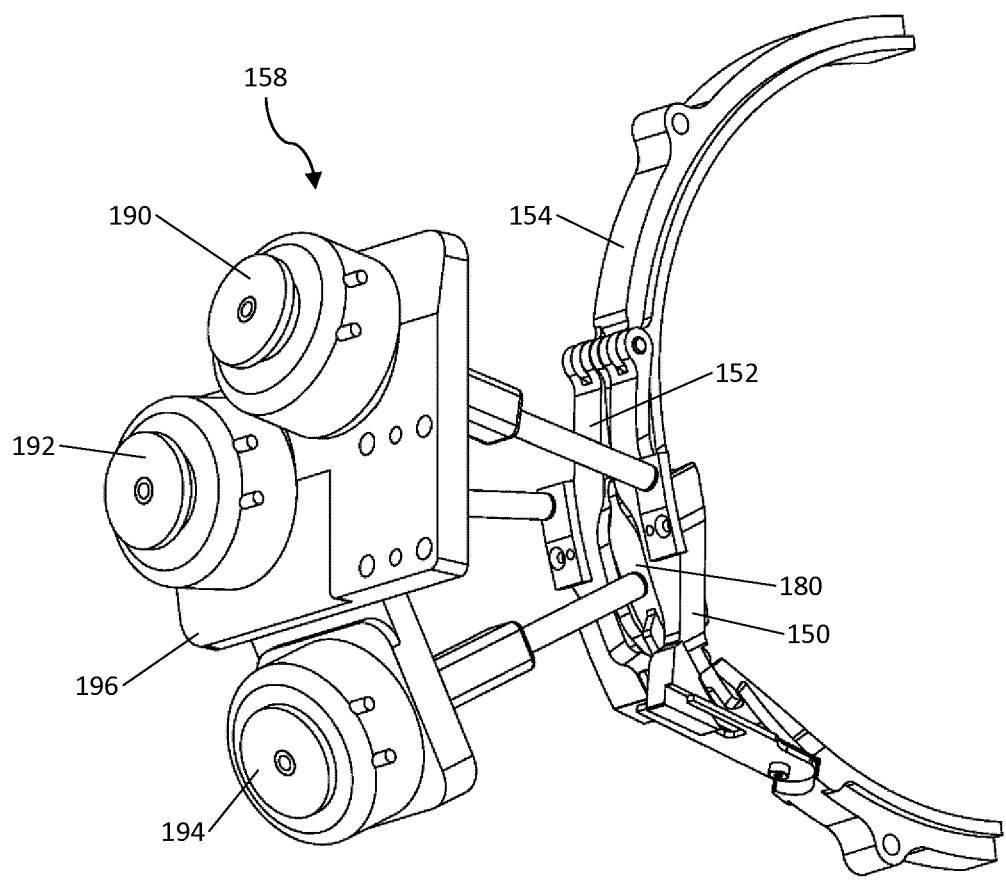

The blocking deflector 180 is configured to inhibit accidental movement of the plurality of pulley segments 144 between the engaged region and the disengaged region, through the gap 168 of the barrier 154. The blocking deflector 180 has a generally elongate shape with a curve matching that of the outer peripheral surface of the segmented pulley 142. At a root or proximal end thereof, the blocking deflector 180 is rotatably coupled to the barrier 156, such that the blocking deflector 180 is radially movable between a third idle position and a third active position. In the subject embodiment, the third idle position is a radially outward position of the blocking deflector 180 (as shown in FIGS. 13 and 17), and the third active position is a radially inward position of the blocking deflector 180 (as shown in FIGS. 14 and 20). The blocking deflector 180 includes a blocking structure 182 at a distal end thereof. The blocking structure 182 projects radially inward and extends at least partially across the gap 168, when the blocking deflector 180 is in the third active position. The blocking structure 182 includes a central recess 184, a first blocker 186 and a second blocker 188. The second blocker 188 is located opposite the first blocker 186, and the central recess 184 is located between the first blocker 186 and the second blocker 188. The central recess 184 is configured to receive the bridge 170 of the barrier 154, when the blocking deflector 180 is in the third active position. The first blocker 186 is located adjacent the engaging deflector 150. The second blocker 188 is located adjacent the disengaging deflector 152.

The motivator assembly 158 is configured to move the engaging deflector 150, the disengaging deflector 152 and the blocking deflector 180 between their respective active and idle positions. As shown in FIG. 17, the motivator assembly 158 comprises a first motivator 190, a second motivator 192, a third motivator 194, a motivator support structure 196 and a spring assembly 198. Each of the motivators 190, 192, 194 comprises a solenoid coupled to a push rod, which extends radially inward from the solenoid. The first motivator 190 is aligned with the engaging deflector 150, the second motivator 192 is aligned with the disengaging deflector 152 and the third motivator 194 is aligned with the blocking deflector 180. The solenoid of the first motivator 190 can be energized to push the engaging deflector 150 (via the push rod) from the first idle position to the first active position, as shown in FIGS. 17 and 18. Likewise, the solenoid of the second motivator 192 can be energized to push the disengaging deflector 152 from the second idle position to the second active position, as shown in FIGS. 17 and 19. Finally, the solenoid of the third motivator 194 can be energized to push the blocking deflector 180 from the third idle position to the third active position, as shown in FIGS. 17 and 20.

The motivator support structure 196 is connected to each of the motivators 190, 192, 194 and is coupled to the housing 132. The motivator support structure 196 is configured to support the motivators 190, 192, 194 and secure them in place. In some embodiments, the motivator support structure 196 may be integrally formed with the housing 132. In other embodiments, the motivator support structure 196 may be coupled to the housing 132 by fasteners, welding, interlocking features or other suitable mechanisms.

The spring assembly 198 extends between the distal tips of the deflectors 150, 152, 180 and the barrier 154. The spring assembly 198 is configured to bias the deflectors 150, 152, 180 towards their respective idle positions. The spring assembly 198 is further configured to inhibit the deflectors 150, 152, 180 from moving radially outward beyond their respective idle positions. Accordingly, the spring assembly 198 comprises a spring 200, which engages the distal tips of the deflectors 150, 152, 180 and biases the deflectors 150, 152, 180 towards the first, second and third idle positions, respectively. The spring assembly 198 further comprises a stop 202. The stop 202 abuts the deflectors 150, 152, 180 when in their idle positions and inhibits the deflectors 150, 152, 180 from moving radially outward beyond the first, second and third idle positions, respectively.

The housing 132 at least partially surrounds and at least partially supports, directly or indirectly, one or more of the first pulley assembly 122, the second pulley assembly 124, the endless member 126, the idler pulley 128 and the actuator system 130. In the subject embodiment, the housing 132 is a generally closed casing. Although, in other embodiments, the housing 132 can be a generally open support structure, such as a supportive frame.

During operation of the transmission 120, the endless member 126 will contact and engage the second pulley assembly 124 within an angular region defined as the contact zone. Conversely, the endless member 126 will not contact or engage the second pulley assembly 124 within an angular region defined as the non-contact zone. Accordingly, the pulley segments 144 of the segmented pulley 142 can be moved into or out of the engaged region while positioned in the non-contact zone without interfering with the endless member 126 and without unloading the transmission 120. As will be appreciated, the non-contact zone will vary depending on which, if any, of the pulley segments 144 are engaged with the endless member 126. The contact zone and the non-contact zone are further described in PCT International Application Publication No. WO/2020/223786, the relevant portions of which are incorporated herein by reference.

By sequentially moving the pulley segments 144 into or out of the engaged region while positioned in the non-contact zone, the endless member 126 can be transitioned from engaging the inner pulley 140 of the second pulley assembly 124 to engaging the segmented pulley 142 of the second pulley assembly 124, or vice versa. Transition the endless member 126 between the inner pulley 140 and the segmented pulley 142 is referred to as a "shift" or a "shift event." Further description of the sequence for transitioning the endless member 126 from engaging the inner pulley 140 to engaging the segmented pulley 142 can be found in above-incorporated PCT International Application Publication No. WO/2020/223786. In the subject embodiment, the transmission 120 is in a first gear (LO gear) when the endless member 126 is engaged with the segmented pulley 142, and the transmission 120 is in a second gear (HI gear) when the endless member 140 is engaged with the inner pulley 152.

FIGS. 3 to 7 show a sequence for moving one of the pulley segments 144 from the disengaged region to the engaged region, during an engaging shift event. The engaging shift event transitions the endless member 126 from contacting the inner pulley 140 to contacting the segmented pulley 142, thereby engaging the endless member 126 with the segmented pulley 142. As will be appreciated, the pulley segment 144 that is moving from the disengaged region to the engaged region in FIGS. 3 to 7 may be described as a transitioning pulley segment, and is one of the plurality of pulley segments 144 of the second pulley 142. Similarly, the follower 156 coupled to the transitioning pulley segment 144 may be described as a transitioning follower and is one of the plurality of followers 156. Prior to the engaging shift event, both the engaging deflector 150 and the disengaging deflector 152 are in their idle positions, as shown in FIG. 3, and are out of the rotational path of the pulley segments 144 and the followers 156.

To begin the engaging shift event, the engaging deflector 150 is moved to the first active position, during rotational operation of the transmission 120. In the subject embodiment, the first motivator 190 is energized to push the engaging deflector 150 from the first idle position to the first active position. The engaging deflector 150 moves radially inward from the first idle position to the first active position, by rotating about an axis at the root of the deflector 150. The axis at the root of the deflector 150 is generally aligned with the second axis 136. When the engaging deflector 150 is in the first active position, the engaging cam 160 is located in the rotational path of the transitioning follower 156. More particularly, the engaging cam 160 is located in the rotation path of the contact surface 164 of the transitioning follower 156.

Figure 5:
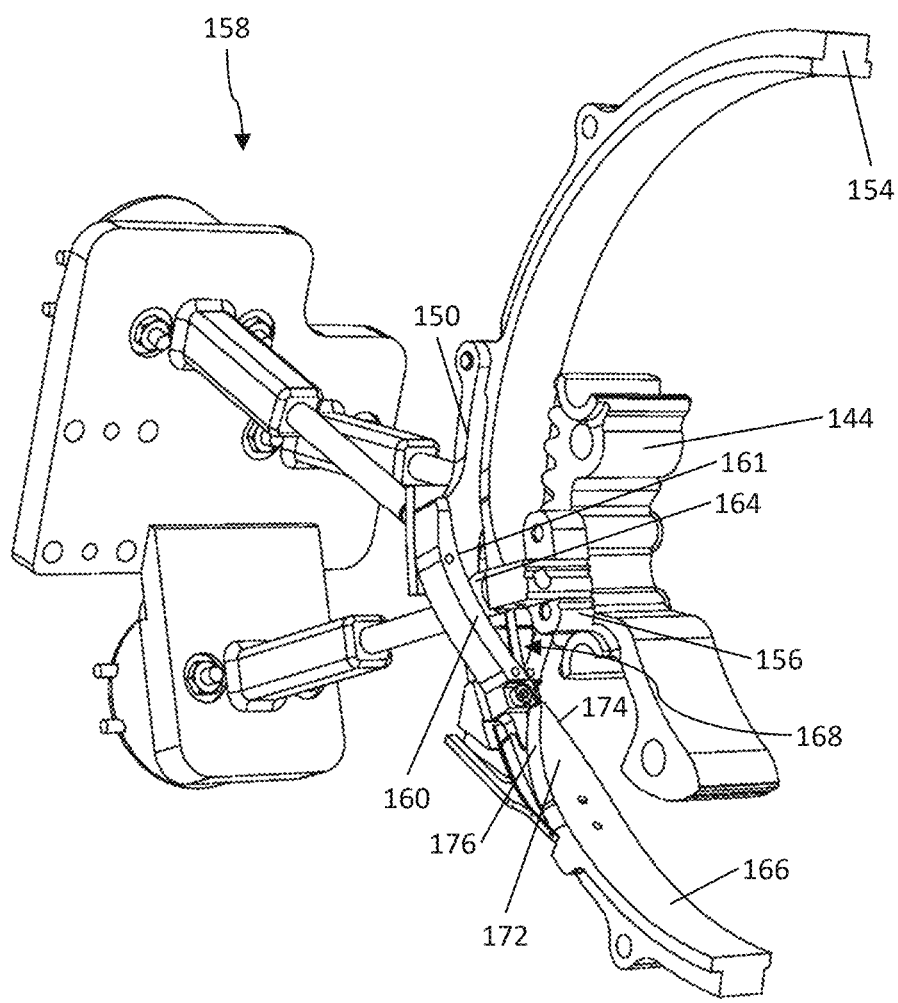
Figure 6:
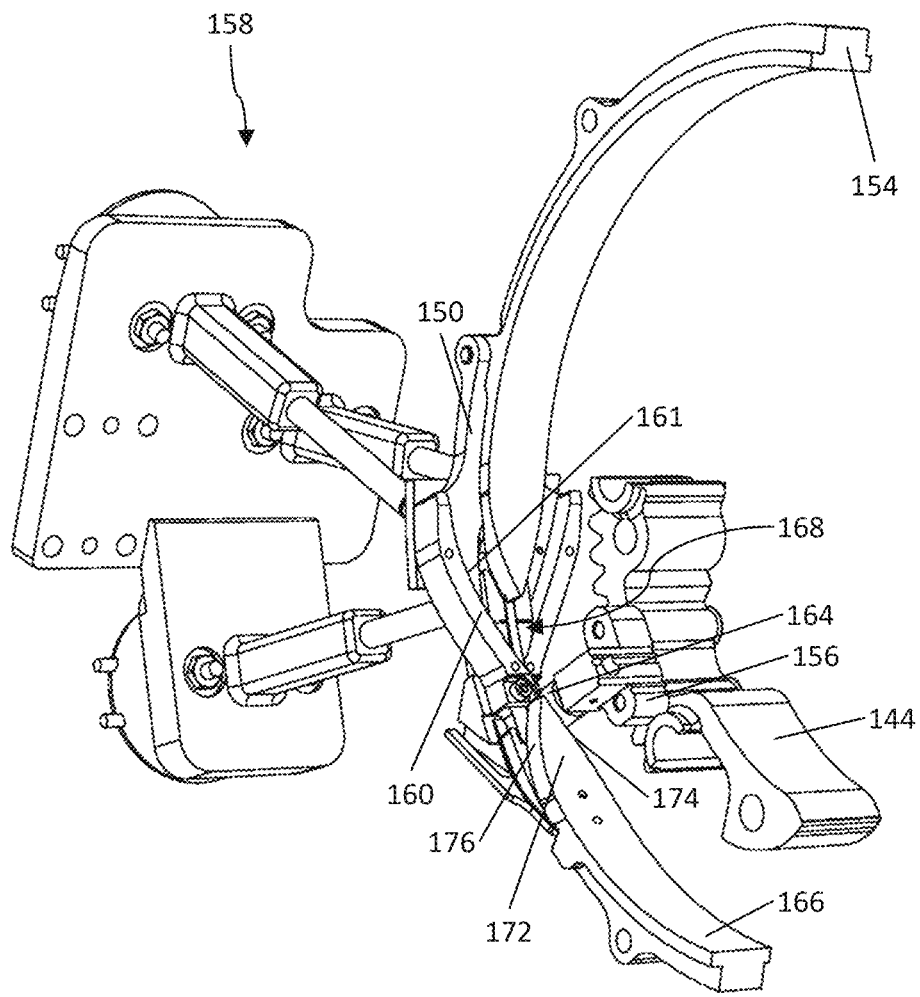
Figure 7:
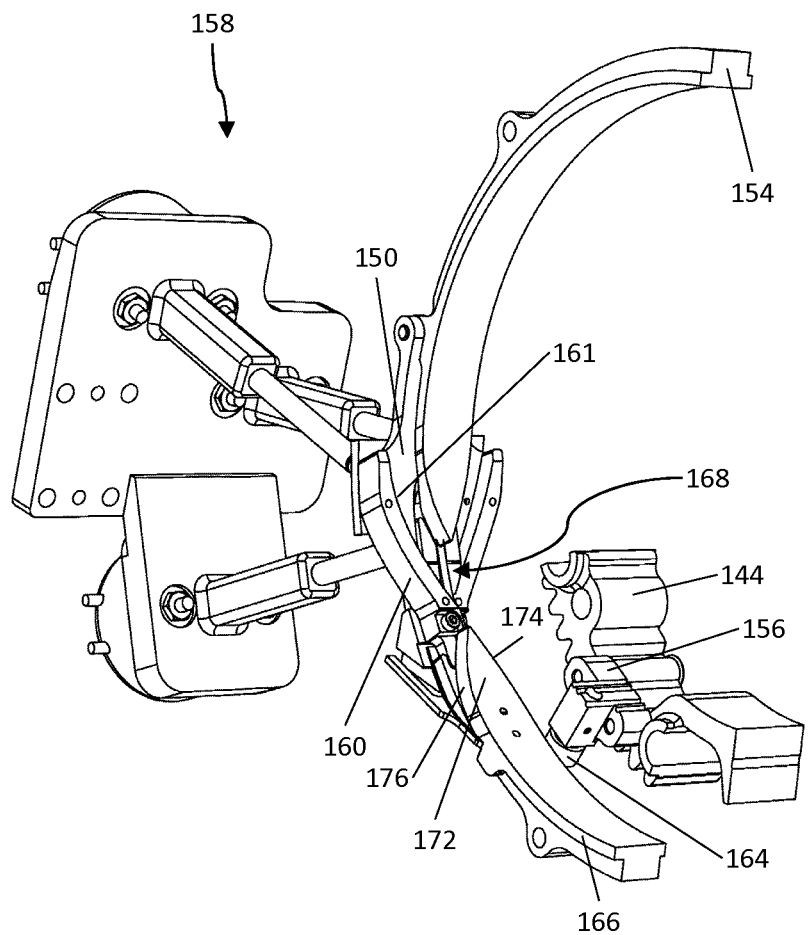

As the transmission 120 rotates, the contact surface 164 of the transitioning follower 156 contacts the engaging cam surface 161 of the engaging cam 160 and is deflected from the disengaged side of the actuator system 130 towards the engaged side (as shown in FIG. 5). This deflection of the contact surface 164 causes the respective transitioning follower 156 to move towards the engaged side, which in turn drives (i.e., pushes, in the subject embodiment) the transitioning pulley segment 144 towards the engaged region. As the transmission 120 continues to rotate, the contact surface 164 passes from the engaging cam surface 161 to the fixed engaging surface 174 of the fixed deflector 172 (as shown in FIG. 6). Thereafter, the fixed engaging surface 174 continues to deflect the contact surface 164, and resultantly the transitioning follower 156, towards the engaged side of the actuator system 130, until the transitioning pulley segment 144 is in the engaged region (as shown in FIG. 7). This process repeats for each subsequent follower 156 until all of the pulley segments 144 have been moved into the engaged region. Once all of the pulley segments 144 are in the engaged region, the engaging shift event is complete and the endless member 126 will have transitioned from contacting the inner pulley 142 to contacting the segmented pulley 142. To prepare for a subsequent shift event, the engaging deflector 150 may be moved to the first idle position. In the subject embodiment, the first motivator 190 is de-energized and the spring 200 of the spring assembly 194 pushes the engaging deflector 150 back to the first idle position.

FIGS. 8 to 12 show a sequence for transitioning one of the pulley segments 144 from the engaged region to the disengaged region, during a disengaging shift event. The disengaging shift event transitions the endless member 126 from contacting the segmented pulley 142 to contacting the inner pulley 140, thereby engaging the endless member 126 with the inner pulley 140. As will be appreciated, the pulley segment 144 that is moving from the disengaged region to the engaged region in FIGS. 8 to 12 may be described as a transitioning pulley segment, and is one of the plurality of pulley segments 144 of the second pulley 142. Similarly, the follower 156 coupled to the transitioning pulley segment 144 may be described as a transitioning follower and is one of the plurality of followers 156. Prior to the disengaging shift event, both the engaging deflector 150 and the disengaging deflector 152 are in their idle positions, as shown in FIG. 3, and are out of the rotational path of the pulley segments 144 and the followers 156.

To begin the disengaging shift event, the disengaging deflector 152 is moved to the second active position, during rotational operation of the transmission 120. In the subject embodiment, the second motivator 192 is energized to push the disengaging deflector 152 from the second idle position to the second active position. The disengaging deflector 152 moves radially inward from the second idle position to the second active position, by rotating about an axis at the root of the deflector 152. The axis at the root of the deflector 152 is generally aligned with the second axis 136. When the disengaging deflector 152 is in the second active position, the disengaging cam 162 is located in the rotational path of the transitioning follower 156. More particularly, the disengaging cam 162 is located in the rotation path of the contact surface 164 of the transitioning follower 156.

Figure 10:
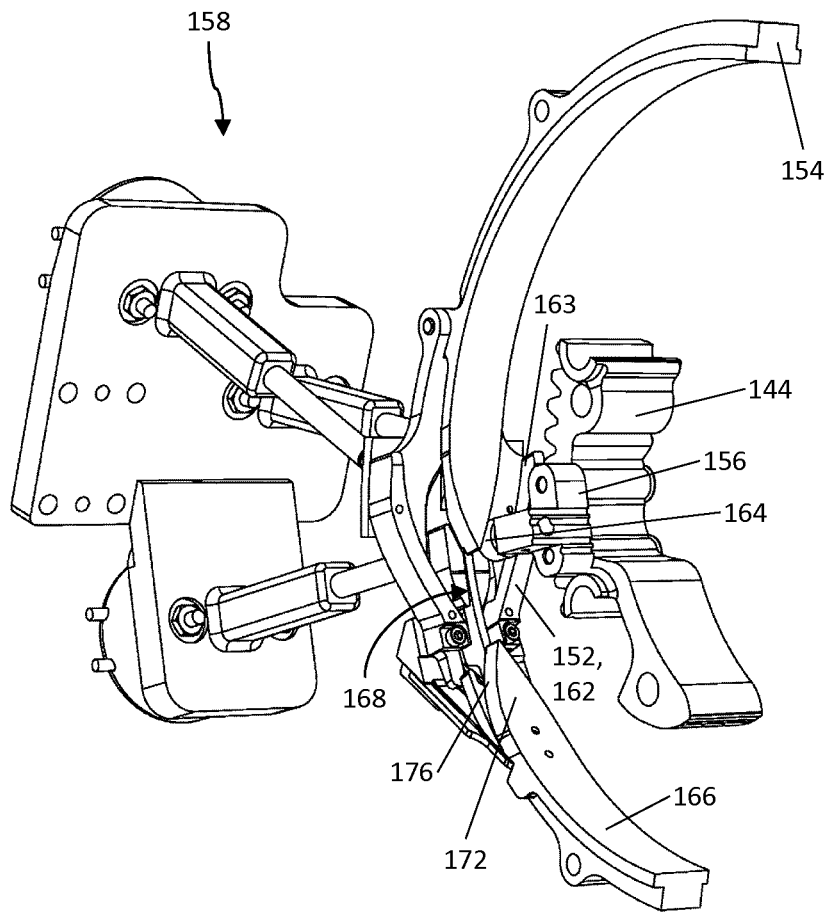
Figure 11:
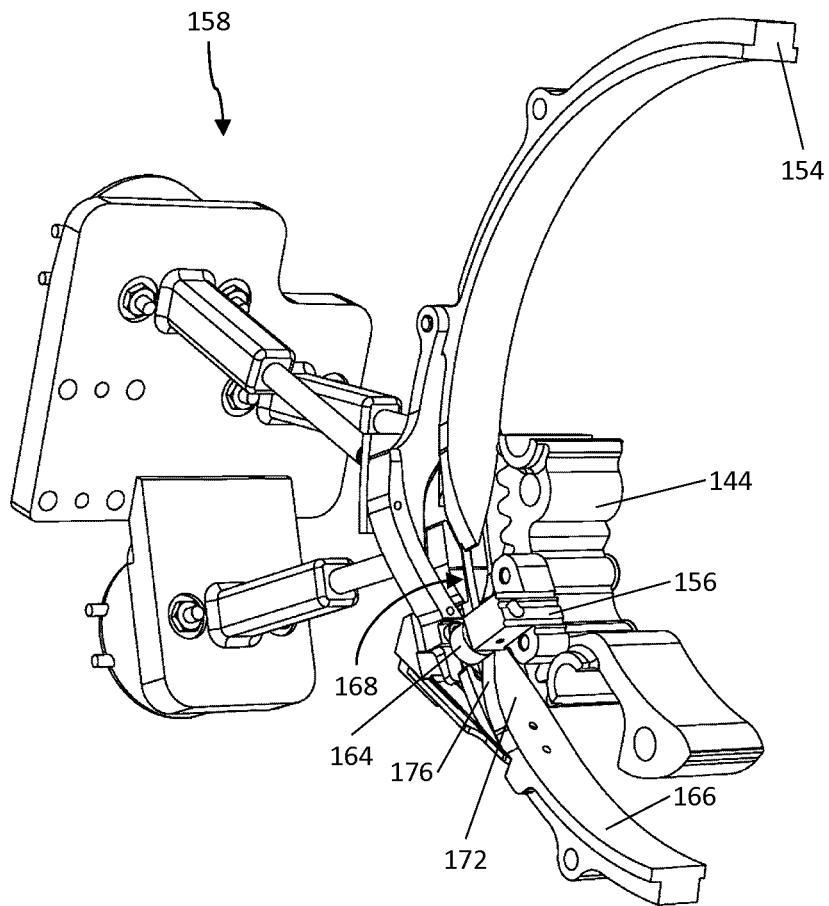
Figure 12:
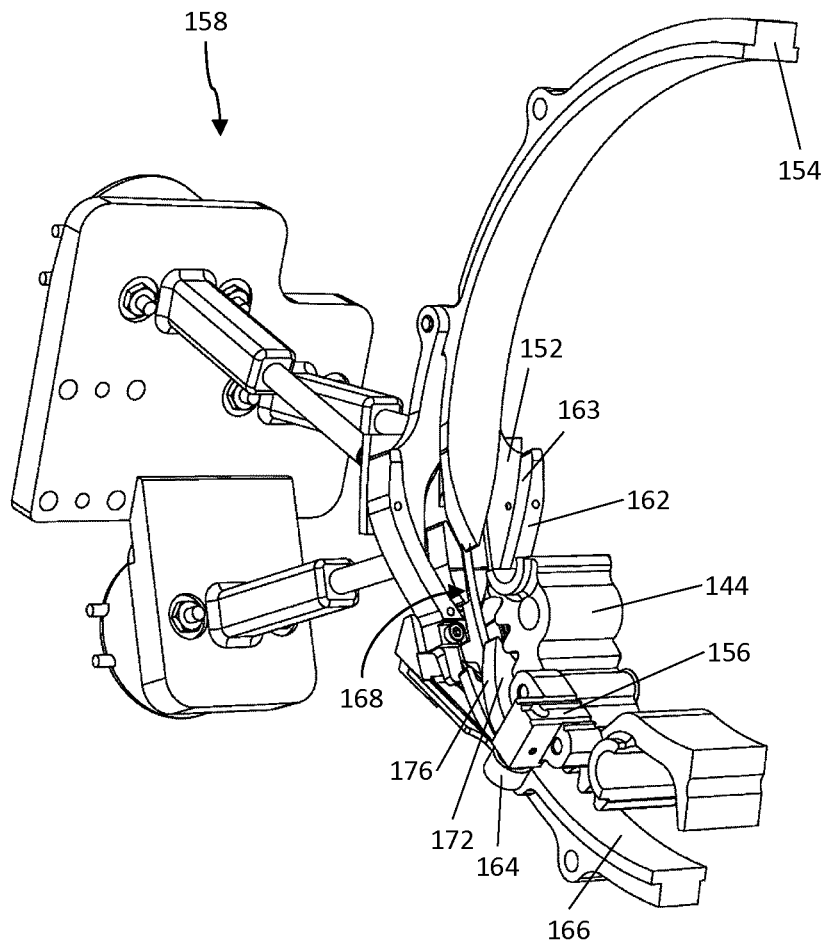

As the transmission 120 rotates, the contact surface 164 of the transitioning follower 156 contacts the disengaging cam surface 163 of the disengaging cam 162 and is deflected from the engaged side of the actuator system 130 towards the disengaged side (as shown in FIG. 10). This deflection of the contact surface 164 causes the respective transitioning follower 156 to move towards the disengaged side, which in turn drives (i.e., pulls, in the subject embodiment) the transitioning pulley segment 144 towards the disengaged region. As the transmission 120 continues to rotate, the contact surface 164 passes from the disengaging cam surface 163 to the fixed disengaging surface 176 of the fixed deflector 172 (as shown in FIG. 11). Thereafter, the fixed disengaging surface 176 continues to deflect the contact surface 164, and resultantly the transitioning follower 156, towards the disengaged side of the actuator system 130, until the transitioning pulley segment 144 is in the disengaged region (as shown in FIG. 12). This process repeats for each subsequent follower 156 until all of the pulley segments 144 have been moved into the disengaged region. Once all of the pulley segments 144 are in the disengaged region, the disengaging shift event is complete and the endless member 126 will have transitioned from contacting the segmented pulley 142 to contacting the inner pulley 142. To prepare for a subsequent shift event, the disengaging deflector 152 may be moved to the second idle position. In the subject embodiment, the second motivator 192 is de-energized and the spring 200 of the spring assembly 194 pushes the disengaging deflector 152 back to the second idle position.

As will be appreciated, since the engaging deflector 150 and the disengaging deflector 152 cooperate with the fixed deflector 172 to move the pulley segments 144 between the engaged region and the disengaged region, both the engaging deflector 150 and the disengaging deflector 152 can be shorter than would be necessary if the deflectors 150, 152 operated alone to move the pulley segments 144 between the engaged region and the disengaged region. Shortening the deflectors 150, 152 can reduce their weight and may help to avoid interference with other elements of the transmission 120.

Additionally, since the deflectors 150, 152 move radially between their idle and active positions, the distance each deflector 150, 152 needs to move during a shift event is minimal. That is, each deflector 150, 152 only needs to move radially inward a distance sufficient for the cam surfaces 161, 163 to contact the followers 156 during the shift event. As will be appreciated, the distance of this radially inward movement can be as little as a portion of the height of the contact surface 164 of each follower 156. In contrast, if a deflector moves axially during a shift event, the deflector will need to move a distance at least equal to the width from one axial side of where the follower contacts the deflector to the opposite axial side of where the follower contacts the deflector. An example of an axially moving deflector is shown and described in PCT International Application No. PCT/CA2019/051713, the relevant portions of which are incorporated herein by reference. As will be appreciated, the distance an axial deflector is required to move during a shift event is greater than the distance the deflectors 150, 152 are required to move. Moving the deflectors 150, 152 a shorter distance during a shift event can facilitate timing for the shift event and may provide more forgiving synchronization between the movements of the deflectors and the pulley segments.

Moreover, by moving the deflectors 150, 152 radially between their idle and active positions during a shift event, overlap between the rotational path of the followers 156 and the movement of the deflectors 150, 152 may be minimized. In contrast, if a deflector moves axially from one side of the followers to the other during a shift event, the deflector will sweep though the rotational path of the followers and may overlap a larger portion of the rotational path. Reducing the overlap between the rotational path of the followers 156 and the movement of the deflectors 150, 152 during a shift event can help to avoid interference during the shift event. Additionally, by reducing the aforementioned overlap, the window of time for moving the deflectors 150, 152 during a shift event may be improved. That is, during a shift event, a deflector can begin moving from its idle position to its active position as soon as a follower passes the region where interference could occur. Accordingly, by reducing an overlapping region between the rotational path of the followers 156 and the movement of the deflectors 150, 152, it may be possible to begin movement of the deflectors 150, 152 sooner than would be possible with a larger overlapping region. In the subject embodiment, each of the deflectors 150, 152 can begin moving from its idle position to its active position as soon as the roller with the contact surface 164 finishes passing by the cam 160, 162 of the respective deflector 150, 152, which can occur before the roller with the contact surface 164 completely passes by the respective deflector 150, 152 during rotational operation of the transmission 120.

FIGS. 13 to 16 show a sequence for inhibiting unintentional movement of the pulley segments 144 between the engaged region and the disengaged region, during rotational operation of the transmission 120. Although only one of the pulley segments 144 is shown, it will be appreciated that the sequence inhibits unintentional movement of the plurality of pulley segments 144. This sequence for inhibiting movement of the pulley segments 144 can occur before and/or after a shift event, to prevent accidental movement of the pulley segments 144 between the engaged region and the disengaged region.

To begin the aforementioned sequence, the blocking deflector 180 is moved to the third active position (as shown in FIG. 14). In the subject embodiment, the third motivator 194 is energized to push the blocking deflector 180 from the third idle position to the third active position. The blocking deflector 180 moves radially inward from the third idle position to the third active position, by rotating about an axis at the root of the deflector 180. The axis at the root of the deflector 180 is generally aligned with the second axis 136. When the blocking deflector 180 is in the third active position, the blocking structure 182 blocks at least a portion of the gap 168, which inhibits the follower 156 from passing through the gap 168 and thereby inhibits movement of the pulley segment 144 between the engaged region and the disengaged region. As will be appreciated, the blocking structure 182 does not need to block the entire gap 168. In the subject embodiment, the blocking structure 182 blocks a sufficient portion of the gap 168 so that the remaining portion of the gap 168 is narrower than the roller on the follower 156, which prevents the follower 156 from passing through the gap 168 and thereby prevents the pulley segment 144 that is coupled to the follower 156 from moving between the disengaged and engaged regions.

Additionally, when the blocking deflector 180 is in the third active position, the blocking structure 182 is located adjacent the intended rotational path of the followers 156. In the subject embodiment, the blocking structure 182 is located adjacent the rotational path defined by the contact surfaces 164 of the followers 156. Accordingly, if one of the followers 156 strays from the rotational path as the pulley segment 144 passes the blocking structure 182, the blocking structure 182 will contact the contact surface 164 of the follower 156 and deflect the follower 156 back towards the intended rotational path. Accordingly, when the blocking deflector 180 is in the third active position, the blocking deflector 180 can help to maintain the pulley segments 144 in the intended region (i.e., in the engaged region or the disengaged region as desired).

Although one or more specific embodiments and potential benefits thereof have been shown and described above, other embodiments and benefits may be appreciated by those skilled in the art. A selection of further embodiments is provided below. However, these further embodiments should not be interpreted as an exhaustive list of all embodiments that would be appreciated by those skilled in the art.

Although the transmission 120 has been shown and described as comprising an idler pulley 128, it will be appreciated that in other embodiments the idler pulley may be omitted. In some embodiments, the idler pulley may be omitted and the endless member may be elastic or adjustable to control tension in the endless member.

Although the transmission 120 has been shown and described as comprising a single segmented pulley 142, it will be appreciated that in other embodiments the transmission may comprise multiple segments pulleys. In some embodiments, the first pulley assembly and the second pulley assembly may each comprise an inner pulley and an outer segmented pulley, such that the transmission includes two segmented pulleys. In some embodiments, one or more of the pulley assemblies may comprise an inner pulley and a plurality of segmented pulleys, where each segmented pulley sequentially increases in diameter.

Although the transmission 120 has been shown and described as comprises a single actuator system 130, it will be appreciated that in other embodiments the transmission may comprise multiple actuator systems. In some embodiments, such as embodiments where the transmission includes multiple segmented pulleys, the transmission may comprise a plurality of actuator systems, with one actuator system for each of the segmented pulleys.

Although the engaging deflector 150, the disengaged deflector 152 and the blocking deflector 180 have been shown and described as coupled to the barrier 154, it will be appreciated that in other embodiments the deflectors may be coupled to other elements of the transmission. In some embodiments, one or more of the deflectors may be coupled to the housing. In some embodiments, one or more of the deflectors may be coupled to the motivator assembly, such as to the motivator support structure.

Although the followers 156 have been shown and described as comprising a roller that provides the contact surface 164, it will be appreciated that in other embodiments the followers may comprises a protrusion, a fixed slider, a swiveling slider or other elements, which provide the contact surface. In some embodiments where the followers comprise rollers, one or more of the rollers may comprise a ball bearing, a needle bearing or a bushing.

Although the followers 156 have been shown and described as extending radially outward from the pulley segments 144, it will be appreciated that in other embodiments the followers may extend in other directions from the pulley segments. In some embodiments, each follower may extend radially inward from the respective pulley segment. As will be appreciated, in embodiments where the followers extend radially inward from the pulley segments of the segmented pulley, the actuator system may be located radially inward of the segmented pulley and may be generally inverted from that shown and described above. As an example, in such embodiments, the engaging cam and the disengaged cam may project radially outward from the engaging deflector and the disengaged deflector, respectively, and the deflectors may move radially outward from their idle positions to their active positions. Further examples will be appreciated by those skilled in the art.

Although each of the followers 156 has been shown and described as being coupled to a respective one of the pulley segments 144, it will be appreciated that in other embodiments the followers may be integrally formed with the pulley segments. In some embodiments, each of the followers may be integrally formed with a respective one of the pulley segments. In some embodiments, each of the integrally formed followers may comprise a protrusion that is integrally formed with a respective pulley segment and extends from an axial side of the respective pulley segment, and the protrusion provides the contact surface.

Although the actuator system 130 has been shown and described as comprising a blocking deflector 180 and a barrier 154, it will be appreciated that in some embodiments these elements may be omitted. In some embodiments, only the blocking deflector may be omitted. In other embodiments, both the barrier and the blocking deflector may be omitted. Though, it will be appreciated that accidental movement of the pulley segments may be more likely in such embodiments. In embodiments where the blocking deflector is omitted, the third motivator may also be omitted.

Although each of the motivators 190, 192, 194 has been shown and described as comprising a solenoid coupled to a push rod, it will be appreciated that in other embodiments the motivators may comprise other elements. In some embodiments, the motivators may comprise servos or other motors for moving the deflectors between their idle and active positions. In some embodiments, the motivator for the blocking deflector may comprise a spring that maintains the blocking deflector in the third active position and a solenoid that can be energized to move the blocking deflector from the third active position to the third idle position. Such embodiments may be desirable when the blocking deflector will predominately be located in the third active position and energy savings for the solenoid are preferred.

Although the barrier 154 has been shown and described as comprising a circumferentially extending ring, in other embodiments the barrier may comprise different shapes. In some embodiments, the barrier may comprise a plate or a wall that is positioned between the rotational path of the followers when the pulley segments are in the engaged region and the rotational path of the followers when the pulley segments are in the disengaged region.

As will be appreciated, in some embodiments the transmission may further comprise a tensioner assembly, an idler lock and/or an idler stop all as shown and described in PCT International Application No. PCT/CA2021/051322, the relevant portions of which are incorporated herein by reference. In some embodiments, the transmission may further comprise one or more transition segment sets as shown and described in PCT International Application No. PCT/CA2018/051475, the relevant portions of which are incorporated herein by reference.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. An actuator system for a segmented pulley transmission, the actuator system comprising:
    an engaging deflector radially movable between a first active position and a first idle position;
    a disengaging deflector radially movable between a second active position and a second idle position; and
    a motivator assembly for moving the engaging deflector and the disengaging deflector between the first active and idle positions and the second active and idle positions, respectively,
    wherein, in the first active position, the engaging deflector is configured to move a plurality of pulley segments of the segmented pulley transmission axially from a disengaged region to an engaged region during rotational operation of the segmented pulley transmission,
    wherein, in the second active position, the disengaging deflector is configured to move the plurality of pulley segments axially from the engaged region to the disengaged region during rotational operation of the segmented pulley transmission, and
    wherein, in the first and second idle positions, respectively, the engaging deflector and the disengaging deflector do not move the plurality of pulley segments during rotational operation of the segmented pulley transmission.

2. The actuator system of claim 1, wherein the engaging deflector and the disengaging deflector are independently movable between the first active and idle positions and the second active and idle positions, respectively.

3. The actuator system of claim 1, wherein the engaging deflector includes an engaging cam and the disengaging deflector includes a disengaging cam, and wherein the engaging and disengaging cams are configured to move the plurality of pulley segments between the engaged region and the disengaged region during rotational operation of the segmented pulley transmission.

4. The actuator system of claim 1, further comprising a barrier configured to restrict movement of the plurality of pulley segments between the engaged region and the disengaged region during rotational operation of the segmented pulley transmission.

5. The actuator system of claim 4, wherein the barrier comprises a gap to permit movement of the plurality of pulley segments between the engaged region and the disengaged region.

6. The actuator system of claim 5, wherein the barrier comprises a circumferentially extending wall and the gap is located in the circumferentially extending wall.

7. The actuator system of claim 5, further comprising a blocking deflector radially movable between a blocking position and a third idle position, wherein, during rotational operation of the segmented pulley transmission, the blocking deflector obstructs movement of the plurality of pulley segments through the gap when in the blocking position and does not obstruct moment of the pulley segments when in the third idle position.

8. The actuator system of claim 7, wherein the blocking deflector is rotatably coupled to the barrier.

9. The actuator system of claim 4, wherein at least one of the engaging deflector and the disengaging deflector is rotatably coupled to the barrier.

10. The actuator system of claim 4, further comprising a fixed deflector that includes an engaging surface, the engaging surface cooperating with the engaging deflector to move the plurality of pulley segments from the disengaged region to the engaged region during rotational operation of the segmented pulley transmission.

11. The actuator system of claim 10, wherein the fixed deflector further includes a disengaging surface, the disengaging surface cooperating with the disengaging deflector to move the plurality of pulley segments from the engaged region to the disengaged region during rotational operation of the segmented pulley transmission.

12. The actuator system of claim 11, wherein the engaging cam surface is located on a first side of the fixed deflector and the disengaging cam surface is located on a second side of the fixed deflector, opposite the first side.

13. The actuator system of claim 10, wherein the fixed deflector is integrally formed with the barrier.

14. The actuator system of claim 1, further comprising a plurality of followers for coupling to the plurality of pulley segments, each of the followers being couplable to a respective one of the pulley segments.

15. The actuator system of claim 14, wherein the engaging deflector and the disengaging deflector move the plurality of pulley segments between the engaged region and the disengaged region by deflecting the plurality of followers coupled to the plurality of pulley segments, thereby driving the pulley segments between the engaged region and the disengaged region during rotational operation of the segmented pulley transmission.

16. The actuator system of claim 15, wherein each of the followers comprises a roller that includes a contact surface for contacting the engaging deflector and the disengaging deflector.

17. The actuator system of claim 1, wherein the motivator assembly comprises at least one solenoid for moving the engaging deflector and the disengaging deflector between the first active and idle positions and the second active and idle positions, respectively.

18. The actuator system of claim 17, wherein the at least one solenoid comprises a first solenoid for moving the engaging deflector from the first idle position to the first active position, and wherein the at least one solenoid comprises a second solenoid for moving the disengaging deflector from the second idle position to the second active position.

19. The actuator system of claim 1, wherein the motivator assembly comprises at least one spring biasing the engaging deflector and the disengaging deflector toward the first and second idle positions, respectively.

20. A segmented pulley transmission comprising:
a first pulley assembly rotatable about a first axis;
a second pulley assembly spaced apart from the first pulley assembly and rotatable about a second axis, the second pulley assembly comprising:
a fixed pulley; and
a segmented pulley concentric with the fixed pulley and moveable between an engaged region and a disengaged region;
an endless member extending between and rotationally coupling the first pulley assembly and the second pulley assembly;
an actuator system as defined in claim 1 for moving the segmented pulley between the engaged region and the disengaged region; and
a housing at least partially supporting at least one of the first pulley assembly, second pulley assembly, the endless member and the actuator.

\* \* \* \* \*